: US 11,828,974 B2
(45) Date of Patent: Nov. 28, 2023

(12) United States Patent
Lai et al.

(54) BACKLIGHT MODULE AND DISPLAY APPARATUS

(71) Applicant: Coretronic Corporation, Hsin-Chu (TW)

(72) Inventors: Yu-Sung Lai, Hsin-Chu (TW); Chung-Yang Fang, Hsin-Chu (TW); Shih-Wei Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/855,707

(22) Filed: Jun. 30, 2022

(65) Prior Publication Data
US 2023/0003932 A1 Jan. 5, 2023

(30) Foreign Application Priority Data
Jul. 2, 2021 (CN) .......................... 202110750325.1

(51) Int. Cl.
*F21V 8/00* (2006.01)
*G02F 1/1335* (2006.01)

(52) U.S. Cl.
CPC ......... *G02B 6/0056* (2013.01); *G02B 6/0038* (2013.01); *G02B 6/0053* (2013.01); *G02F 1/133531* (2021.01)

(58) Field of Classification Search
CPC ................ G02B 6/0038; G02B 6/0056; G02F 1/133531
See application file for complete search history.

(56) References Cited

U.S. PATENT DOCUMENTS

| 6,028,656 A * | 2/2000 | Buhrer ................ G02F 1/13471 349/196 |
| 8,882,324 B2 * | 11/2014 | Adachi ................ G02B 6/0053 362/339 |
| 2008/0002431 A1 * | 1/2008 | Maeda ................. G02B 6/0038 362/618 |
| 2008/0158912 A1 * | 7/2008 | Chang .................. G02B 6/0038 362/628 |
| 2009/0073344 A1 * | 3/2009 | Lee .................... G02F 1/133606 349/64 |

(Continued)

FOREIGN PATENT DOCUMENTS

| CN | 102411231 | 12/2014 |
| CN | 104456412 | 3/2015 |
| TW | I657291 | 4/2019 |

*Primary Examiner* — Keith G. Delahoussaye
(74) *Attorney, Agent, or Firm* — JCIPRNET

(57) ABSTRACT

A backlight module includes a light guide plate, a light source, a first optical film, and a second optical film. The light source is disposed on one side of a light incident surface of the light guide plate. The first optical film is disposed between the light guide plate and the second optical film. An illumination beam from the light source has a first polarization component and a second polarization component perpendicular to the first polarization component. A ratio of the first polarization component to the second polarization component is greater than or equal to 1.2 and less than or equal to 10. The second optical film includes a substrate and a plurality of prism structures disposed between the substrate and the light guide plate. An included angle between an extending direction of the prism structures and the light incident surface is less than 5 degrees.

25 Claims, 23 Drawing Sheets

(56) References Cited

U.S. PATENT DOCUMENTS

| | | | | |
|---|---|---|---|---|
| 2009/0174843 A1* | 7/2009 | Sakai | .................. | G02F 1/13471 |
| | | | | 349/74 |
| 2015/0268404 A1* | 9/2015 | Chiu | .................... | G02B 6/0073 |
| | | | | 362/625 |
| 2017/0131455 A1* | 5/2017 | Asano | .................. | G02B 6/0038 |
| 2018/0292598 A1* | 10/2018 | Ke | ....................... | G02B 6/0053 |

* cited by examiner

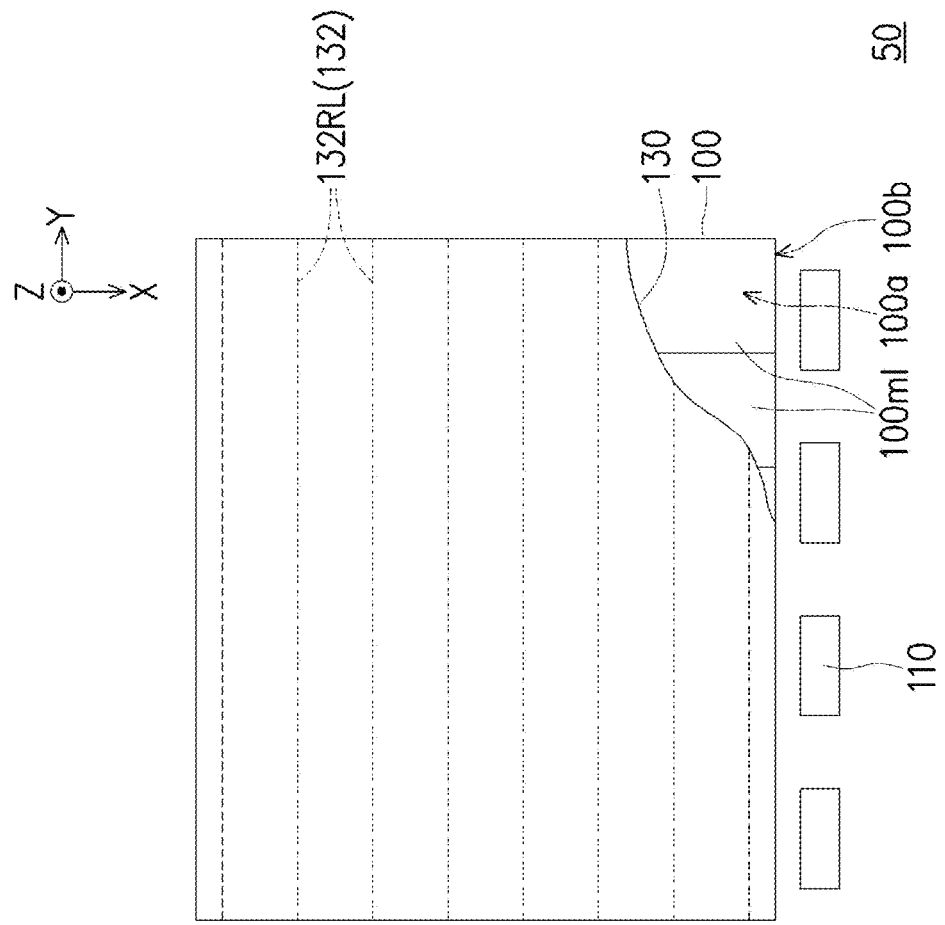

BACKLIGHT MODULE AND DISPLAY APPARATUS

CROSS-REFERENCE TO RELATED APPLICATION

This application claims the priority benefit of China application serial no. 202110750325.1, filed on Jul. 2, 2021. The entirety of the above-mentioned patent application is hereby incorporated by reference herein and made a part of this specification.

BACKGROUND

Technical Field

The invention relates to a display technique, and in particularly, relates to a backlight module and a display apparatus.

Description of Related Art

Along with increasing applications of non-self-luminous displays such as liquid crystal displays, the design of backlight modules also needs to be adjusted for different purposes. In order to improve the light energy utilization rate of a light source, backlight modules equipped with optical brightness enhancement film (BEF) have become one of the mainstreams in the market. Generally, this type of backlight module is equipped with a laminated structure of two optical BEFs (for example, two prism sheets with prism extending directions to be orthogonal to each other), which may guide a light beam emitted from a light guide plate at a large angle to cover a specific angle range (for example, −60 degrees to 60 degrees) of a normal viewing angle to increase the light intensity of the backlight module near the normal viewing angle.

In order to further improve high light collection of the backlight modules, a high light collection type backlight module using reverse prism sheets to replace the two laminated optical BEFs is developed. This type of the backlight module may further increase the total light output near the normal viewing angle (i.e., having a light converging characteristic of a smaller angle range). However, since prism structures of the reverse prism sheet needs to be arranged opposite to the light guide plate, the light emitting surface of the light guide plate may be easily scratched by the prism structures of the reverse prism sheet, which affects the production yield of the backlight module. On the other hand, since the illumination beam generated by such backlight module has a low light beam polarizability, the loss of light energy after passing through a display panel with a polarizer is large, resulting in a poor light energy utilization rate of the display apparatus.

The information disclosed in this BACKGROUND section is only for enhancement of understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY

The invention is directed to a backlight module adapted to generate an illumination beam with a relatively high proportion of a specific polarization component.

The invention is directed to a display apparatus providing a favorable light energy utilization rate.

In order to achieve one or a portion of or all of the objects or other objects, an embodiment of the invention provides a backlight module. The backlight module includes a light guide plate, a light source, a first optical film, and a second optical film. The light guide plate has a light incident surface and a light emitting surface connected to each other. The light source is disposed on one side of the light incident surface of the light guide plate, and is configured to emit an illumination beam. The first optical film is disposed on one side of the light emitting surface of the light guide plate. The illumination beam has a first polarization component parallel to a virtual surface and a second polarization component perpendicular to the virtual surface after passing through the first optical film. The virtual surface is perpendicular to the light incident surface and the light emitting surface. A ratio of the first polarization component to the second polarization component is greater than or equal to 1.2 and less than or equal to 10. The second optical film is disposed on one side of the first optical film facing away from the light guide plate, and includes a substrate and a plurality of prism structures. The prism structures are disposed on one side of the substrate of the second optical film facing the light guide plate, and an included angle between an extending direction of the prism structures and the light incident surface of the light guide plate is less than 5 degrees.

In order to achieve one or a portion of or all of the objects or other objects, an embodiment of the invention further provides a display apparatus. The display apparatus includes a display panel and a backlight module. The backlight module is disposed in overlap with the display panel, and includes a light guide plate, a light source, a first optical film, and a second optical film. The light guide plate has a light incident surface and a light emitting surface connected to each other. The light source is disposed on one side of the light incident surface of the light guide plate, and is configured to emit an illumination beam. The first optical film is disposed on one side of the light emitting surface of the light guide plate. The illumination beam has a first polarization component parallel to a virtual surface and a second polarization component perpendicular to the virtual surface after passing through the first optical film. The virtual surface is perpendicular to the light incident surface and the light emitting surface. A ratio of the first polarization component to the second polarization component is greater than or equal to 1.2 and less than or equal to 10. The second optical film is disposed on one side of the first optical film facing away from the light guide plate, and includes a substrate and a plurality of prism structures. The prism structures are disposed on one side of the substrate facing the light guide plate, and an included angle between an extending direction of the prism structures and the light incident surface of the light guide plate is less than 5 degrees.

Based on the above descriptions, in the backlight module and the display apparatus of an embodiment of the invention, the first optical film and the second optical film are disposed on one side of the light emitting surface of the light guide plate. One side of the second optical film facing the light guide plate is provided with a plurality of prism structures with the extending direction substantially parallel to the light incident surface of the light guide plate. The first optical film located between the prism structures and the light guide plate may increase a polarization component of the illumination beam from the light guide plate in a specific direction, which is beneficial to an increase in the light energy utilization rate of the display apparatus. Moreover, through arrangement of the first optical film, the light emitting surface of the light guide plate is prevented from being scratched by the prism structures of the second optical film, so the production yield of the backlight module is prevented from being affected.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic top view of a backlight module of FIG. 1.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
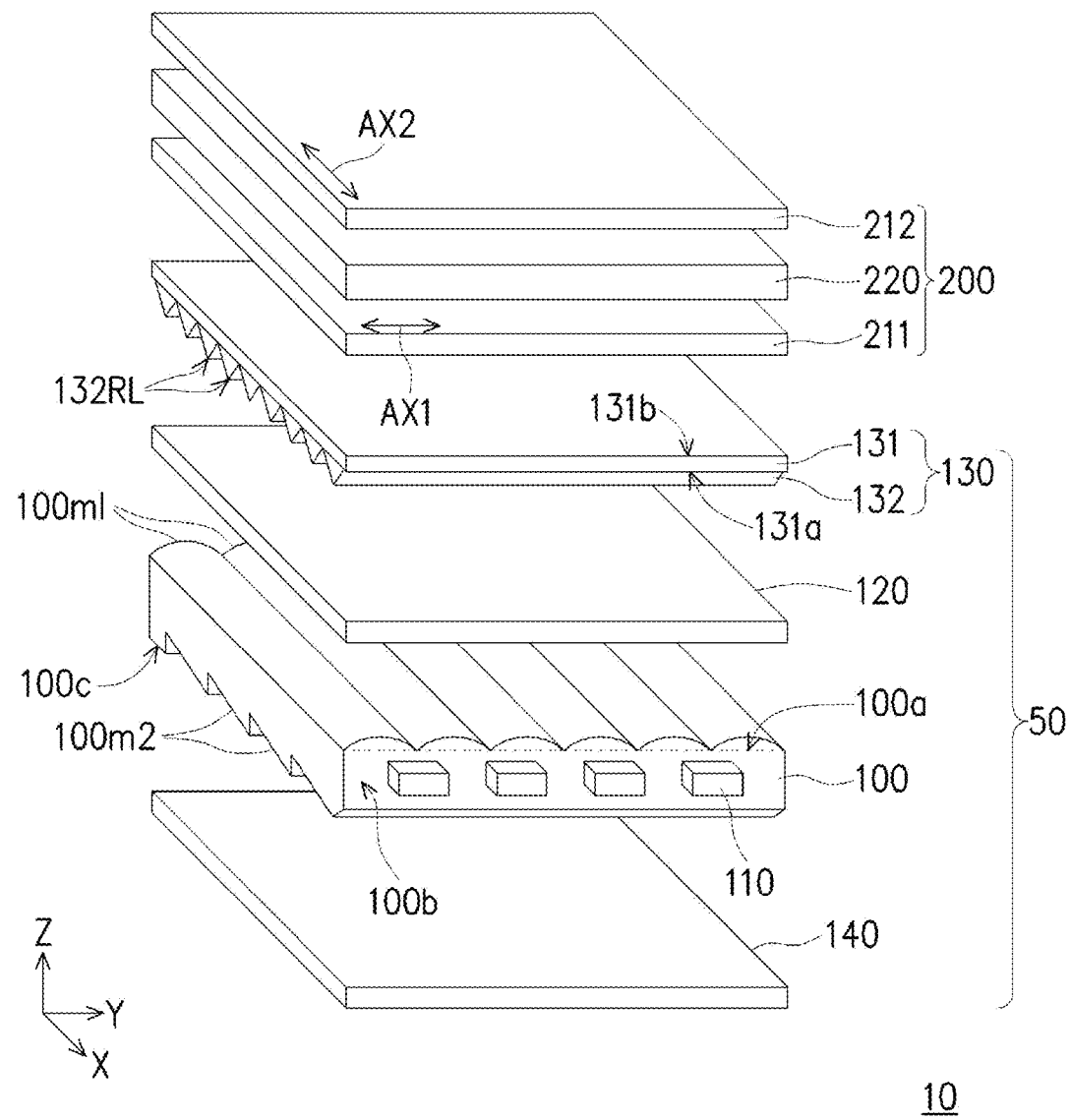
FIG. 1 is a schematic diagram of a display apparatus according to a first embodiment of the invention.
Figure 2A:
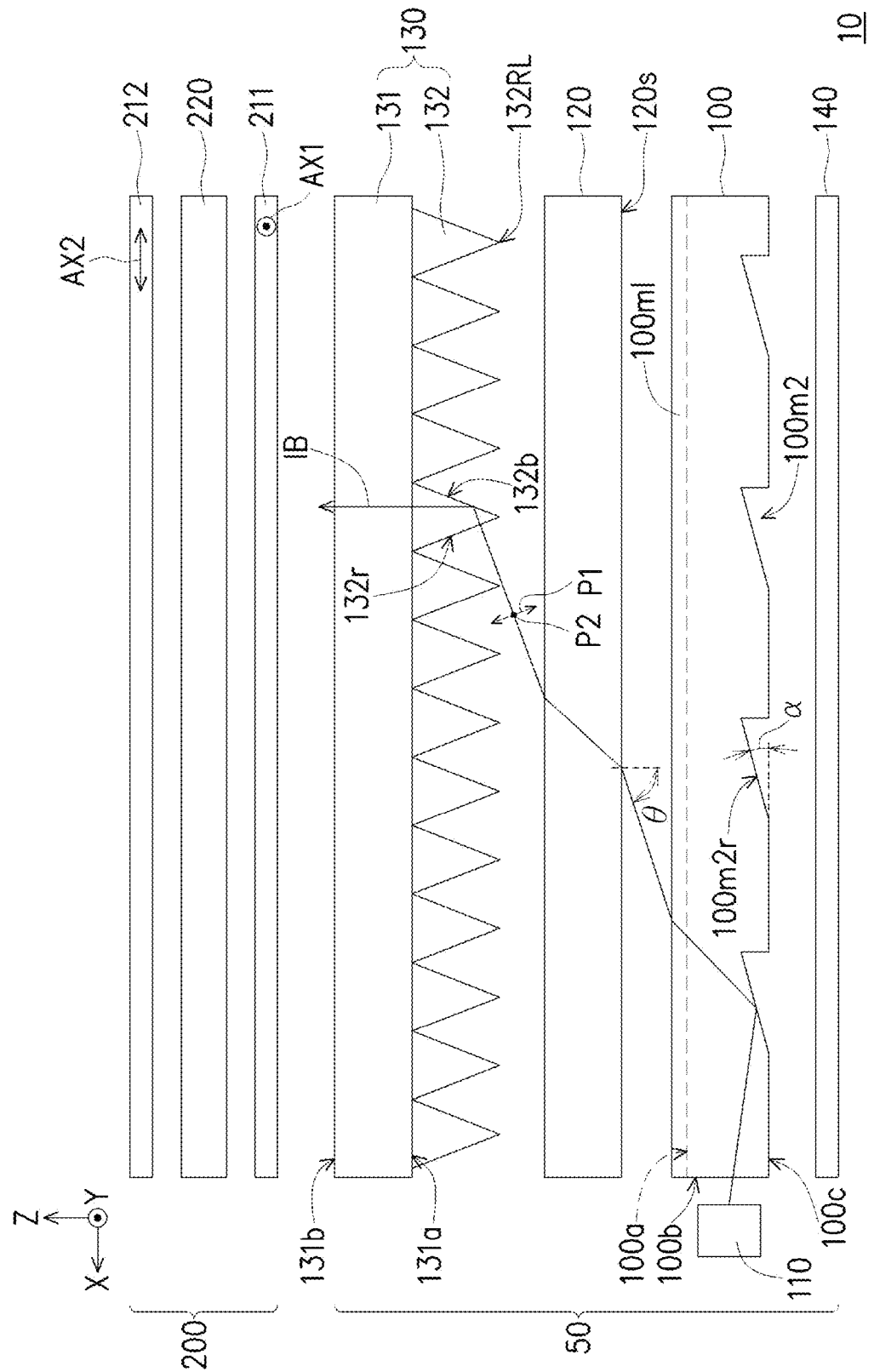
FIGS. 2A and 2B are schematic cross-sectional views of the display apparatus of FIG. 1.
Figure 2B:
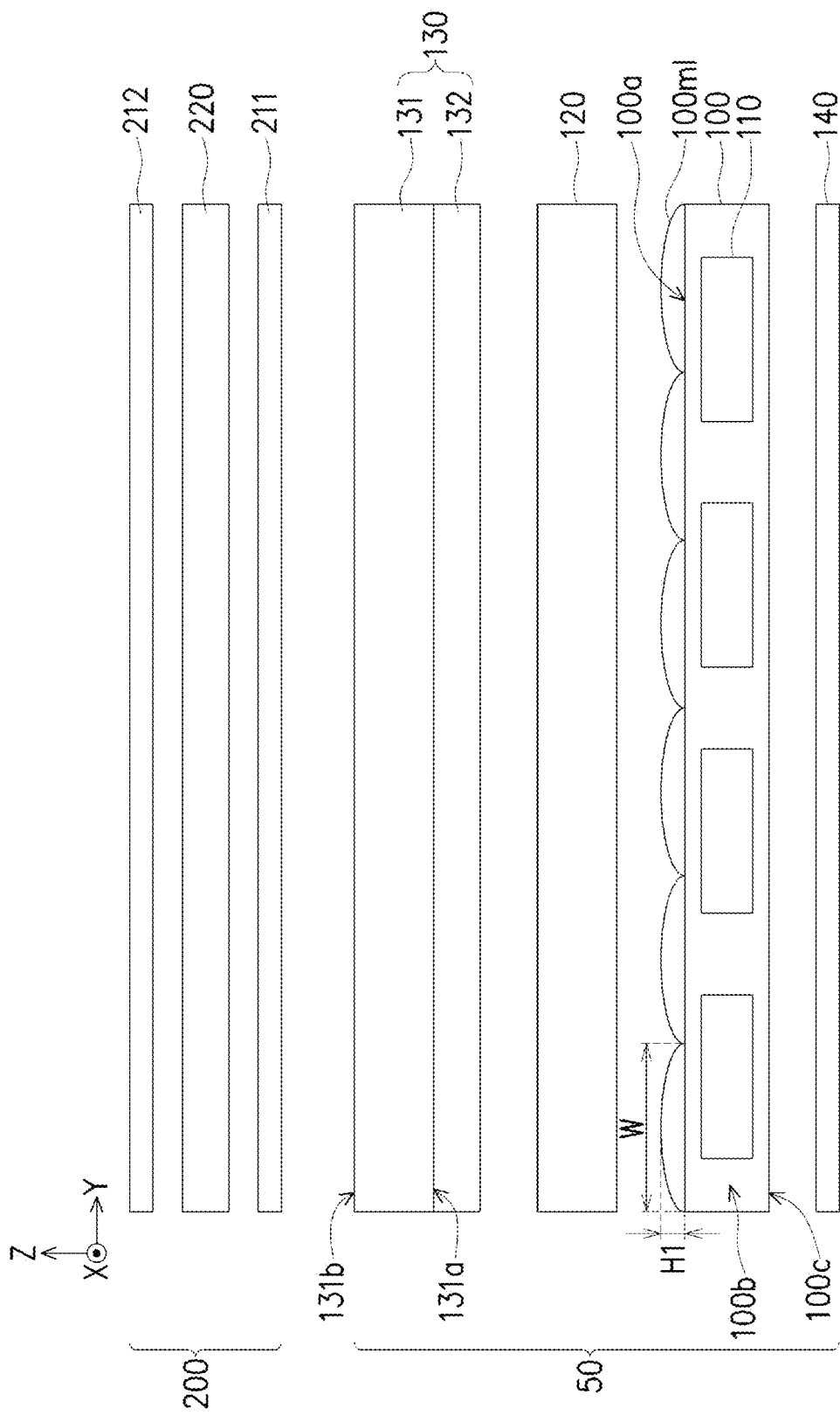
Figure 4B:
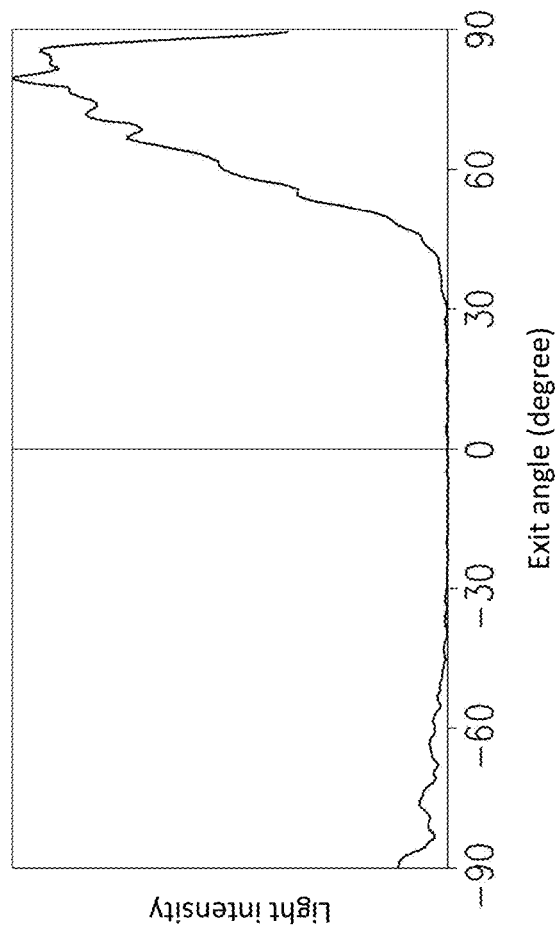
FIG. 4A and FIG. 4B are light intensity distribution diagrams after an illumination beam exits from a light guide plate of FIG. 1.
Figure 4A:
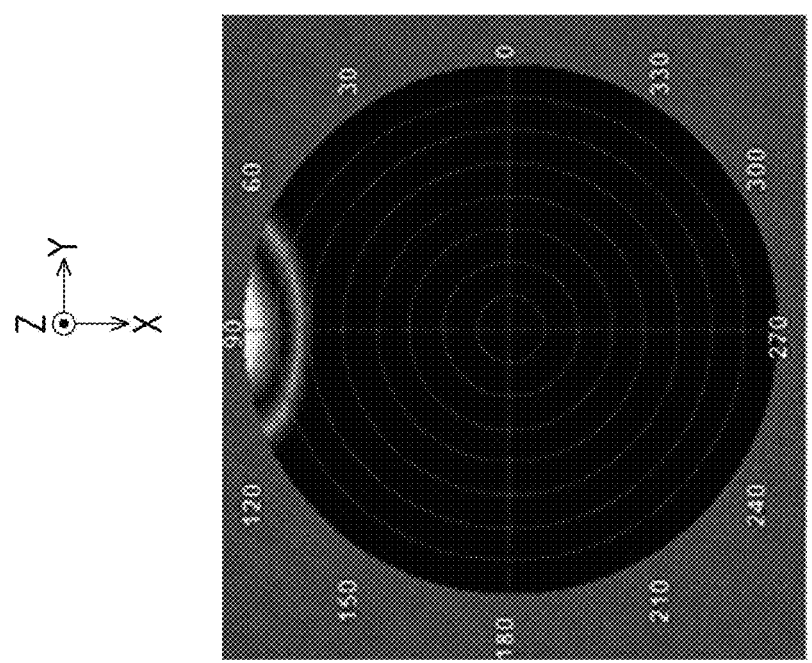
Figure 5A:
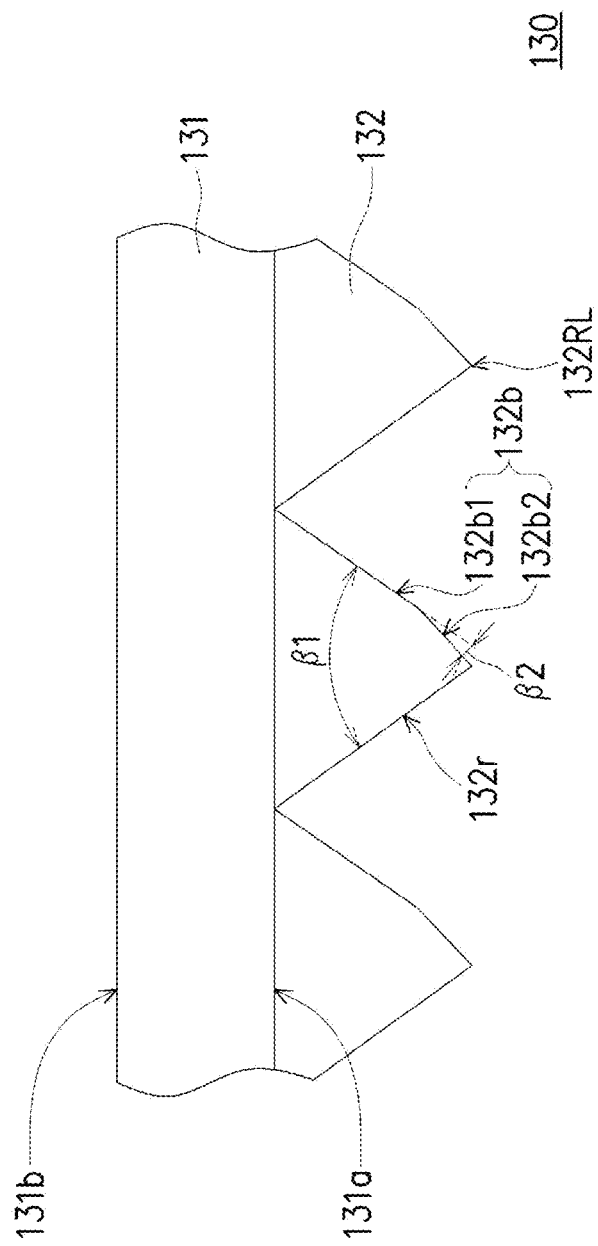
FIG. 5A is a partial enlarged schematic view of a second optical film of FIG. 2A.
Figure 5B:
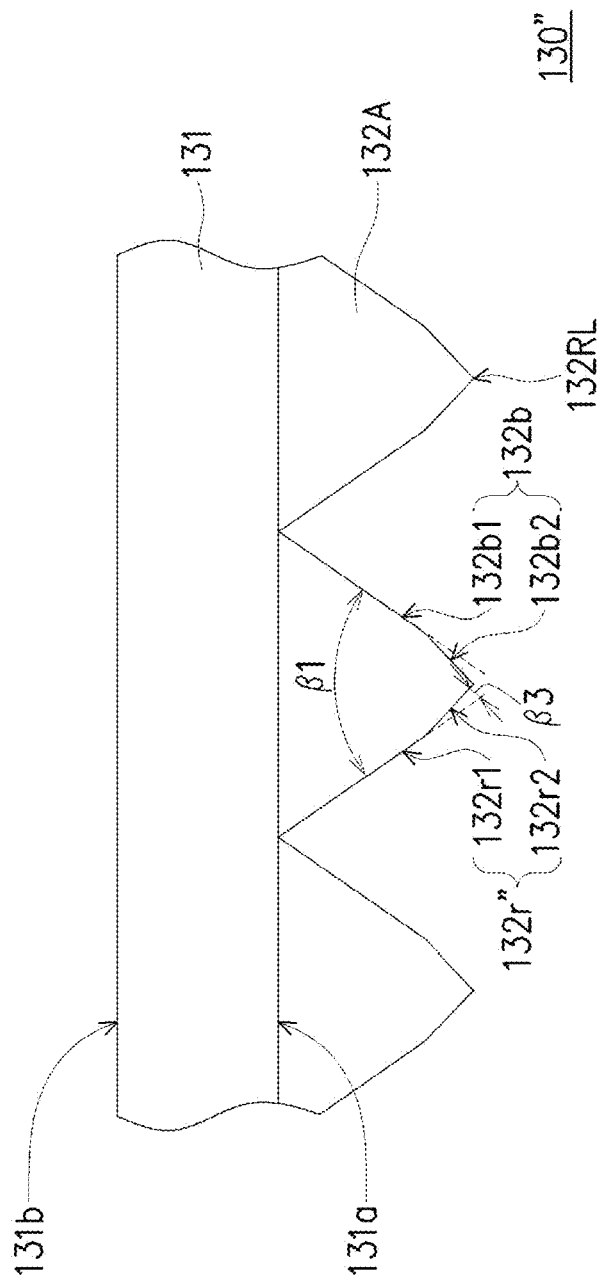
FIG. 5B is a partial enlarged schematic view of a second optical film according to another embodiment of the invention.
Figure 5C:
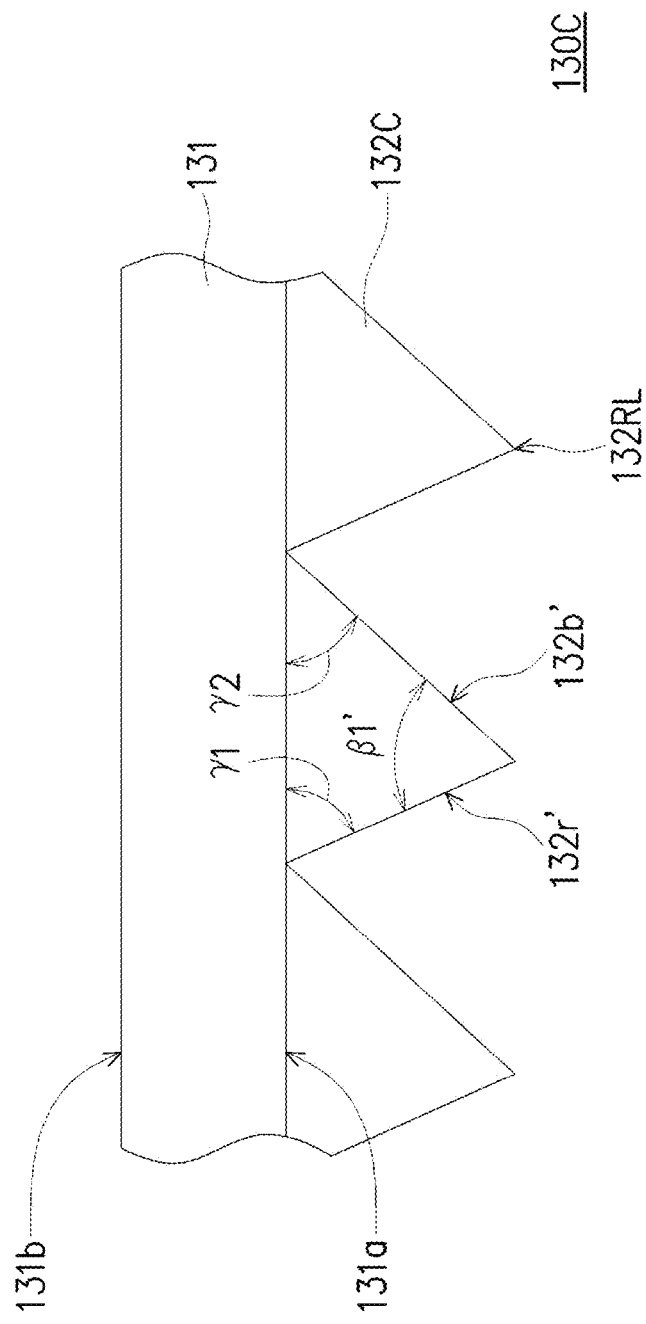
FIG. 5C is a partial enlarged schematic view of a second optical film according to still another embodiment of the invention.

FIG. 1 is a schematic diagram of a display apparatus according to a first embodiment of the invention. FIGS. 2A and 2B are schematic cross-sectional views of the display apparatus of FIG. 1. FIG. 3 is a schematic top view of a backlight module of FIG. 1. FIG. 4A and FIG. 4B are light intensity distribution diagrams after an illumination beam exits from a light guide plate of FIG. 1. FIG. 5A is a partial enlarged schematic view of a second optical film of FIG. 2A. FIG. 5B is a partial enlarged schematic view of a second optical film according to another embodiment of the invention. FIG. 5C is a partial enlarged schematic view of a second optical film according to still another embodiment of the invention. For clarity's sake, FIG. 3 only illustrates a light guide plate 100, a light source 110, and a second optical film 130 of a backlight module 50 in FIG. 1.

Referring to FIG. 1 to FIG. 2B, a display apparatus 10 includes the backlight module 50. The backlight module 50 includes the light guide plate 100, the light source 110, a first optical film 120, and the second optical film 130. The light guide plate 100 has a light incident surface 100b, a light emitting surface 100a, and a bottom surface 100c. The light incident surface 100b is connected to the light emitting surface 100a and the bottom surface 100c. The light emitting surface 100a is opposite to the bottom surface 100c. The light source 110 is disposed on one side of the light incident surface 100b of the light guide plate 100, and is configured to emit an illumination beam IB. Namely, the backlight module 50 of the embodiment is an edge-type backlight module. It should be noted that in the embodiment, a number of the light sources 110 is, for example, four, which does not mean that the invention is limited to the content disclosed in the drawings. In other embodiments, the number of the light sources 110 may be adjusted according to an optical design of the backlight module.

In this embodiment, the light emitting surface 100a of the light guide plate 100 may be selectively provided with a plurality of lenticular lens structures 100m1, and the bottom surface 100c of the light guide plate 100 may be selectively provided with a plurality of optical microstructures 100m2. For example, the lenticular lens structures 100m1 are arranged in a direction Y and extend in a direction X, and the optical microstructures 100m2 are arranged in the direction X and extend in the direction Y. Namely, an extending direction of the lenticular lens structures 100m1 intersects an extending direction of the optical microstructures 100m2. Particularly, the extending direction of the lenticular lens structures 100m1 is substantially perpendicular to the light incident surface 100b of the light guide plate 100. However, the invention is not limited thereto. In other embodiments, a plurality of optical microstructures may be provided on at least one of the light emitting surface and the bottom surface of the light guide plate according to actual light shape requirements.

In this embodiments, each of the lenticular lens structures 100m1 of the light guide plate 100 has a height H1 parallel to a normal direction (for example, a direction Z) of the light emitting surface 100a and a width W parallel to the light incident surface 100b and the light emitting surface 100a, and a ratio of the height H1 to the width W is greater than 0.15. The optical microstructures 100m2 of the light guide plate 100 respectively have a light-facing surface 100m2r. In the embodiment, by setting an included angle α between the light-facing surface 100m2r of the optical microstructure 100m2 and the bottom surface 100c is between 1 degree and 10 degrees, the illumination beam IB may be emitted out from the light emitting surface 100a of the light guide plate 100 at a relatively large angle (for example, greater than 50 degrees). In an exemplary embodiment, the included angle α between the light-facing surface 100m2r and the bottom surface 100c of the light guide plate 100 may be between 4 degrees and 10 degrees.

To be more specific, a light exit type of the light guide plate 100 of the embodiment has concentricity and directivity, and a transmission direction of the illumination beam IB emitted from the light guide plate 100 is substantially deflected toward a normal direction of the light incident surface 100b (for example, a direction opposite to the direction X). For example, a light intensity of the illumination beam IB emitted from the light guide plate 100 is mostly concentrated on a side of the light guide plate 100 relative to the light source 110 (a region near an azimuth angle of 90 degrees in FIG. 4A), and the light intensity is more concentrated in an exit angle range of 50 degrees to 85 degrees on this azimuth (as shown in FIG. 4B). Therefore, the illumination beam IB from the light guide plate 100 may enter the first optical film 120 at a relatively large angle (as shown in FIG. 2A). For example, an included angle θ (i.e., an incident angle) between the illumination beam IB incident to the first optical film 120 and a normal direction of the first optical film 120 toward a first surface 120s of the light guide plate 100 is greater than 50 degrees.

Furthermore, the first optical film 120 is disposed on one side of the light emitting surface 100a of the light guide plate 100. The illumination beam IB from the light guide plate 100 has a first polarization component P1 parallel to a virtual surface (not shown in the figure) and a second polarization component P2 perpendicular to the virtual surface, and the virtual surface here is, for example, an XZ plane, i.e., the virtual surface is perpendicular to the light incident surface 110b and the light emitting surface 110a. Particularly, after the illumination beam IB passes through the first optical film 120, it also has the first polarization component P1 parallel to the aforementioned virtual surface and the second polarization component P2 perpendicular to the virtual surface, wherein a ratio of the first polarization component P1 to the second polarization component P2 is greater than or equal to 1.2 and less than or equal to 10. In an exemplary embodiment, the ratio of the first polarization component P1 to the second polarization component P2 of the illumination beam IB after passing through the first optical film 120 may be greater than or equal to 1.2 and less than or equal to 4.

In this embodiment, a material of the first optical film 120 is, for example, polymethyl methacrylate (PMMA). Therefore, if the illumination beam IB from the light guide plate 100 enters the first optical film 120 at an angle greater than 50 degrees, a transmittance difference of the first polarization component P1 and the second polarization component P2 of the illumination beam IB at a light incident surface (i.e., the first surface 120s in FIG. 2A) of the first optical film 120 may be greater than 10%, and a good polarization separation effect is thereby provided.

Referring to FIG. 3 and FIG. 5A together, the second optical film 130 is disposed on a side of the first optical film 120 facing away from the light guide plate 100 and includes a substrate 131 and a plurality of prism structures 132. The substrate 131 has a surface 131a facing the light guide plate 100 and a surface 131b opposite to the surface 131a. The prism structures 132 of the second optical film 130 are arranged on the surface 131a of the substrate 131 in the direction X and extend in the direction Y. Namely, an extending direction of the prism structures 132 of the embodiment is parallel to the light incident surface 100b of the light guide plate 100, but the invention is not limited thereto. In other embodiments, in order to avoid a moiré pattern produced by the prism structures 132 and the periodic structures of other film layers, the extending direction of the prism structures 132 may not be parallel to the light incident surface 100b of the light guide plate 100, for example, an included angle between the extending direction of the prism structures 132 and the light incident surface 100b of the light guide plate 100 may be less than 15 degrees. In an exemplary embodiment, the included angle between the extending direction of the prism structures 132 and the light incident surface 100b of the light guide plate 100 may be less than 5 degrees.

In detail, each of the prism structures 132 has a prism light-facing surface 132r facing the light source 110 and a shady surface 132b facing away from the light source 110. Here, the prism light-facing surface 132r and the shady surface 132b define a ridge line 132RL of the prism structure 132, and an extending direction of the ridge line 132RL is parallel to the light incident surface 100*b* of the light guide plate 100. The shady surface 132*b* of the prism structure 132 may be divided into two parts, i.e., a first part 132*b*1 and a second part 132*b*2. The first part 132*b*1 is connected between the substrate 131 and the second part 132*b*2. The second part 132*b* is connected between the prism light-facing surface 132*r* and the first part 132*b*1.

Particularly, in this embodiment, an included angle β1 between the first part 132*b*1 of the shady surface 132*b* of the prism structure 132 and the prism light-facing surface 132*r* is between 62 degrees and 68 degrees, and an included angle β2 between the second part 132*b*2 of the shady surface 132*b* and a virtual extending surface of the first part 132*b*1 is between 2 degrees and 4 degrees. Namely, the shady surface 132*b* of the prism structure 132 is a bent surface. The illumination beam IB from the first optical film 120 is deflected toward the normal direction (for example, the direction Z) of the light emitting surface 100*a* after entering the prism structure 132 of the second optical film 130, thereby increasing an output brightness value of the backlight module 50 near the normal viewing angle, and forming a light shape with high light collection.

Although the embodiment of FIG. 5A is configured to illustrate that the shady surface 132*b* of the prism structure 132 of the second optical film 130 has a break angle, the invention is not limited thereto. In other embodiments that are not shown, it is also possible that the prism light-facing surface 132*r* of the prism structure 132 of the second optical film 130 has a break angle, i.e., the prism structure 132 of the second optical film 130 has a break angle on one side surface. In an embodiment, besides that the shady surface 132*b* of a prism structure 132A of a second optical film 130" has a break angle, a prism light-facing surface 132*r*" of the prism structure 132A of a second optical film 130" may also be divided into two parts, i.e., a third part 132*r*1 and a fourth part 132*r*2 (as shown in FIG. 5B). The third part 132*r*1 is connected between the substrate 131 and the fourth part 132*r*2. The fourth part 132*r*2 is connected between the second part 132*b*2 of the shady surface 132*b* and the third part 132*r*1. Similar to the shady surface 132*b*, an included angle β3 between the fourth part 132*r*2 of the prism light-facing surface 132*r*" and a virtual extending surface of the third part 132*r*1 is between 2 degrees and 4 degrees. Therefore, both sides surfaces of the prism structure 132A of the second optical film 130 illustrated in FIG. 5B have the break angles.

In some other embodiments, the prism light-facing surface and the shady surface of the prism structure of the second optical film may also be planar surfaces without break angles. For example, in a prism structure 132C of a second optical film 130C of an embodiment shown in FIG. 5C, neither a prism light-facing surface 132*r*' nor a shady surface 132*b*' has a break angle. Particularly, an included angle γ1 between the prism light-facing surface 132*r*' and the substrate 131 is not equal to an included angle γ2 between the shady surface 132*b*' and the substrate 131, and an included angle β1' between the prism light-facing surface 132*r*' and the shady surface 132*b*' of the prism structure 132C is preferably between 48 degrees and 74 degrees, and is optimally between 48 degrees and 64 degrees. However, the invention is not limited thereto. In an embodiment that is not shown, the included angle between the prism light-facing surface of the prism structure and the substrate of the second optical film may also be equal to the included angle between the shady surface and the substrate, and the included angle between the prism light-facing surface and the shady surface of the prism structure is preferably between 59 degrees and 67 degrees, and is optimally between 60 degrees and 64 degrees.

On the other hand, since an apex angle of the prism structure 132 of the second optical film 130 is an acute angle, it is easy to scratch the light emitting surface 100*a* of the light guide plate 100 to form bright marks or bright spots. By disposing the first optical film 120 between the light guide plate 100 and the second optical film 130, the prism structures 132 on the second optical film 130 may also be prevented from directly contacting the light emitting surface 100*b* of the light guide plate 100, thereby improving production yield of the backlight module 50.

In this embodiment, a material of the substrate of the first optical film 120 (such as the substrate 121 of FIG. 6) and the substrate 131 of the second optical film 130 may be a low complex refractive index material, and the low complex refractive index material includes, for example, polycarbonate (PC), polymethyl methacrylate (PMMA), cyclic olefin polymer (COP) and cellulose triacetate (TAC), but the invention is not limited thereto. In other embodiments, the material of the substrate of the first optical film 120 and/or the substrate 131 of the second optical film 130 may also be a high complex refractive index material, and the high complex refractive index material includes, for example, polyethylene terephthalate (PET), polycarbonate (PC) or a stretched film of cyclic olefin copolymer (COP). Particularly, if the high complex refractive index material is configured to fabricate the substrate of the first optical film 120 and the substrate 131 of the second optical film 130 (i.e., the substrate of the optical film has birefringence), an axial direction of an optical axis (or a material stretching axis) of the substrate of the optical film should be parallel or perpendicular to the light incident surface 100*b* of the light guide plate 100 to avoid phase retardation of the illumination beam IB after passing through these films. Such phase retardation may cause a change of the ratio of the first polarization component P1 to the second polarization component P2 of the illumination beam IB, which results in deterioration of the aforementioned polarization separation effect.

Referring to FIG. 1 to FIG. 2B again, the display apparatus 10 further includes a display panel 200 that is overlapped and disposed on the backlight module 50. The display panel 200 is located on one side of the surface 131*b* of the second optical film 130 and includes two polarizers 211 and 212 and a liquid crystal cell 220. Where, the polarizer 211 is arranged between the liquid crystal cell 220 and the backlight module 50, and the liquid crystal cell 220 is arranged between the polarizer 211 and the polarizer 212. For example, in the embodiment, the polarizer 211 and the polarizer 212 respectively have an absorption axis AX1 and an absorption axis AX2, and axial directions of the two absorption axes AX1 and AX2 are orthogonal to each other, but the invention is not limited thereto. In other embodiments, a relative arrangement relationship of the axial directions of the two absorption axes of the two polarizers of the display panel may be adjusted according to an electric control mode of the liquid crystal cell, which is not limited by the invention.

In this embodiment, the axial direction of the absorption axis AX1 of the polarizer 211 closer to the backlight module 50 in the display panel 200 is perpendicular to the first polarization component P1 of the illumination beam IB (or parallel to the light incident surface 100*b* of the light guide plate 100). Namely, the first polarization component P1 of the illumination beam IB may pass through the polarizer 211 of the display panel 200. Therefore, due to the polarization separation effect of the first optical film 120, the first polarization component P1 of the illumination beam IB incident on the display panel 20 may be increased, thereby improving the light energy utilization rate of the display apparatus 10.

In order to further increase the light energy utilization rate of the display apparatus 10, the backlight module 50 may also optionally include a reflector 140. The reflector 140 is arranged on one side of the bottom surface 100c of the light guide plate 100. For example, in the embodiment, the reflector 140 may be a silver reflector or a white reflector with a reflectivity greater than 95%, but the invention is not limited thereto. In an exemplary embodiment, the reflectivity of the reflector 140 may be greater than 98%.

Other embodiments are listed below to describe the invention in detail, where the same components are denoted by the same symbols, and the description of the same technical content is omitted. The aforementioned embodiment may be referred for descriptions of the omitted parts, and detailed descriptions thereof are not repeated in the following embodiment.

Figure 6:
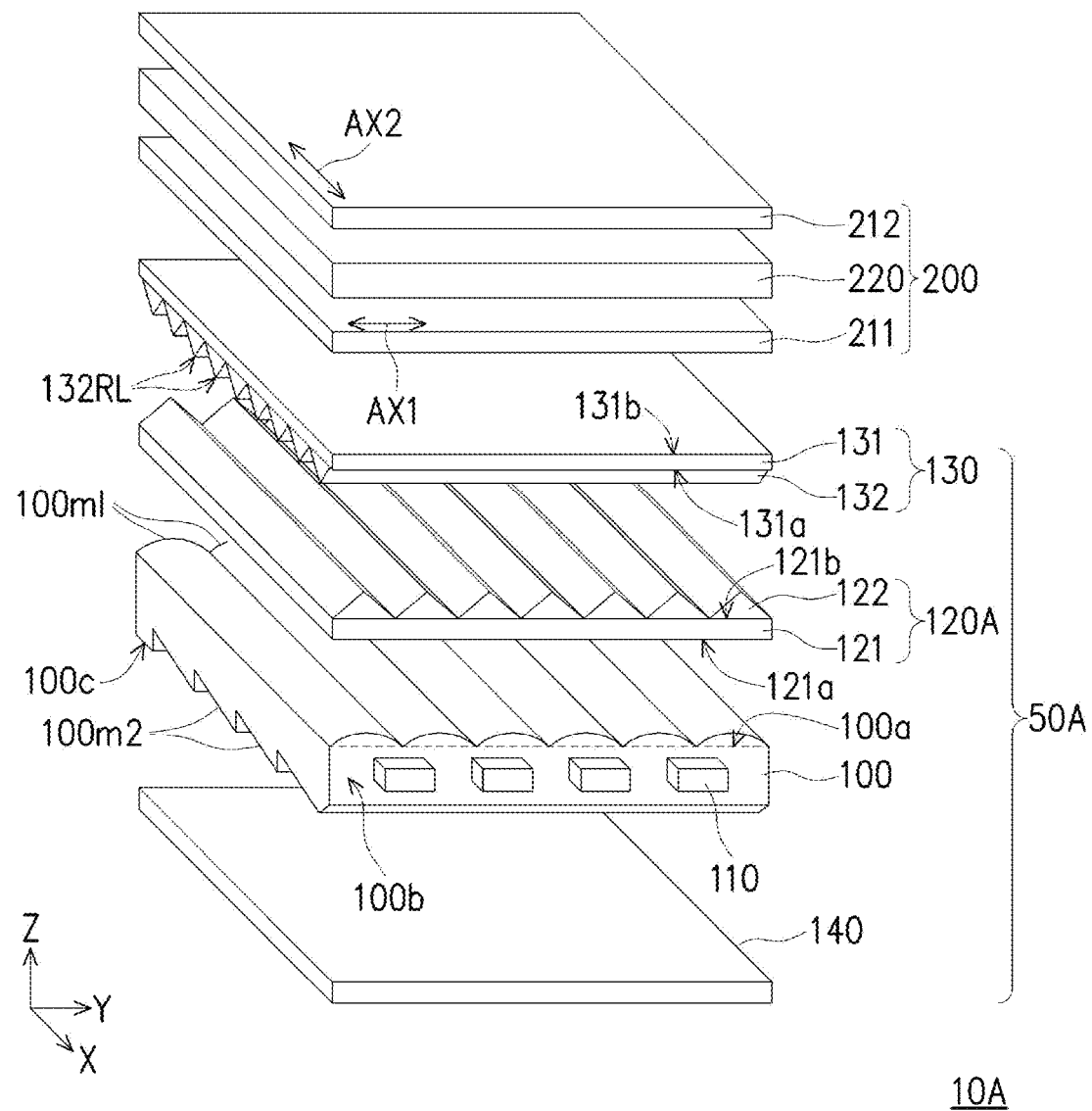
FIG. 6 is a schematic diagram of a display apparatus according to a second embodiment of the invention.
Figure 7:
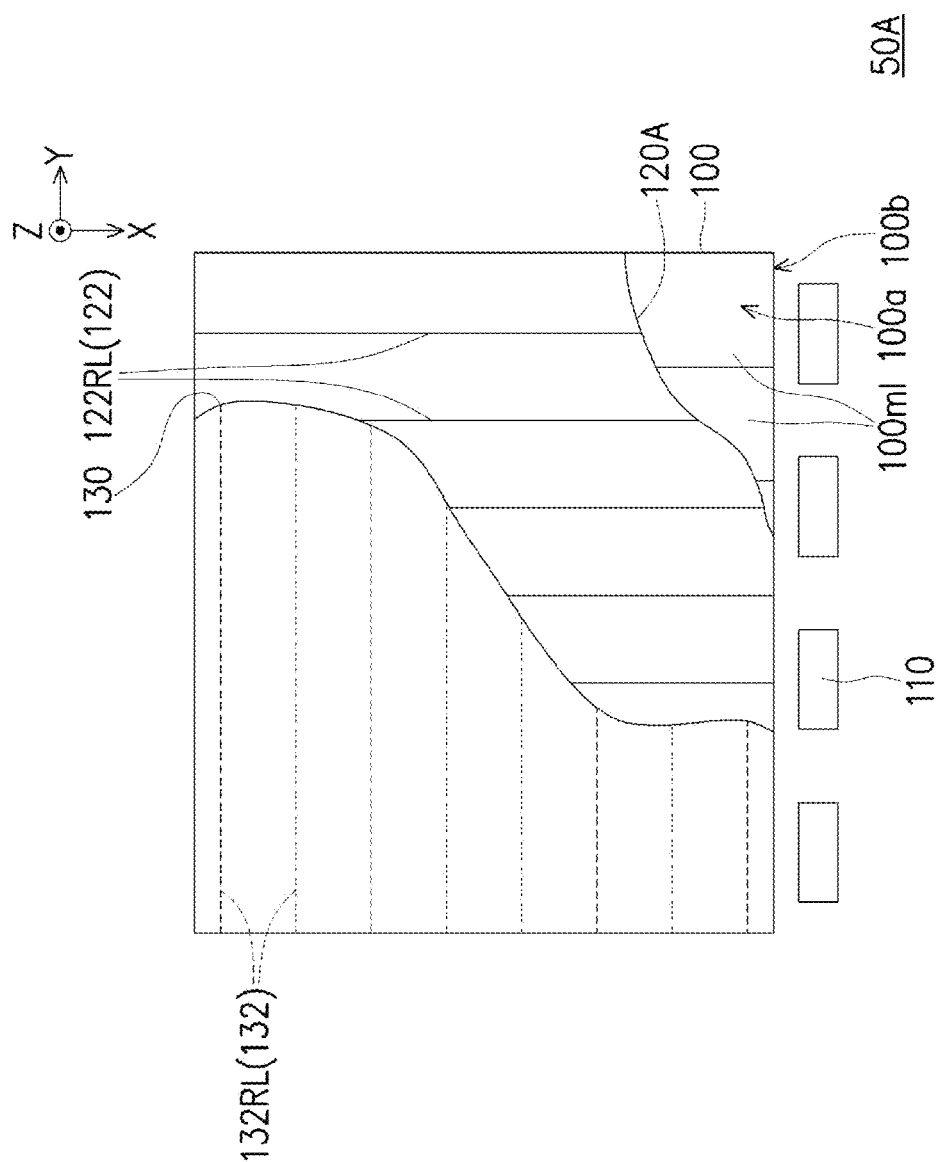
FIG. 7 is a schematic top view of a backlight module of FIG. 6.
Figure 8A:
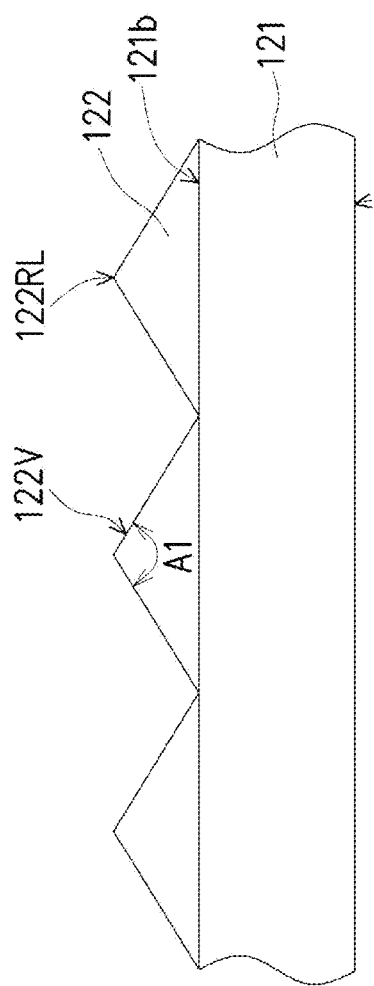
FIG. 8A is a partial enlarged schematic diagram of a first optical film of FIG. 6.
Figure 8B:
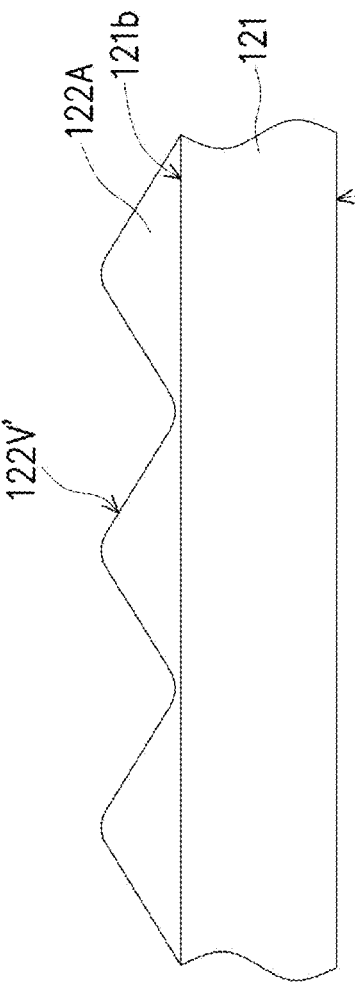
FIG. 8B is a partial enlarged schematic view of a first optical film according to another embodiment of the invention.
Figure 9B:
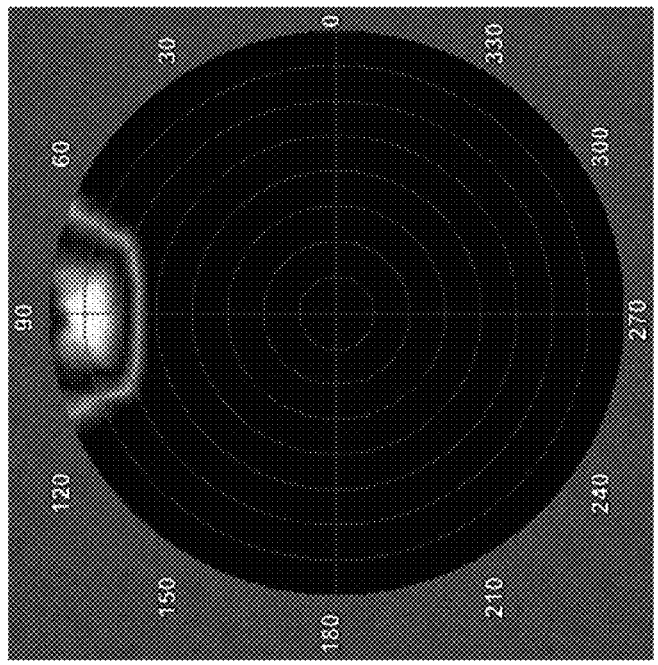
FIG. 9B is a light intensity distribution diagram of the illumination beam after exiting from the first optical film of FIG. 8B.
Figure 9A:
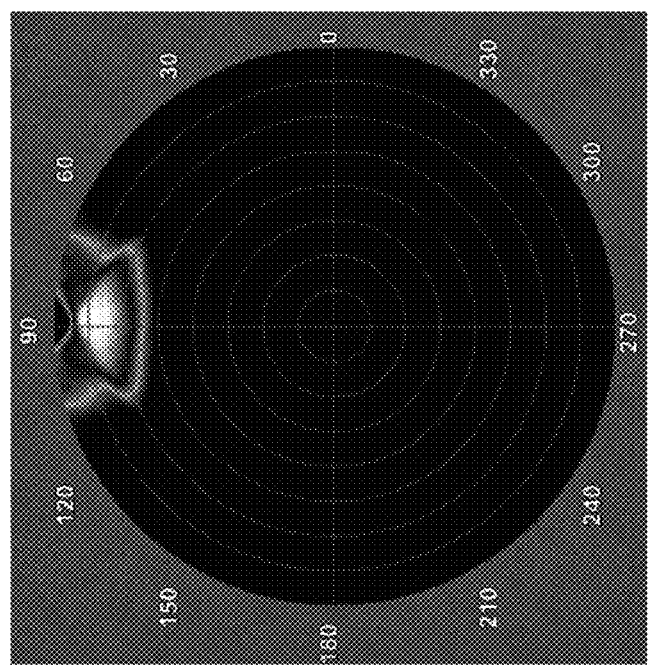
FIG. 9A is a light intensity distribution diagram of an illumination beam after exiting from the first optical film of FIG. 8A.

FIG. 6 is a schematic diagram of a display apparatus according to a second embodiment of the invention. FIG. 7 is a schematic top view of a backlight module of FIG. 6. FIG. 8A is a partial enlarged schematic diagram of a first optical film of FIG. 6. FIG. 8B is a partial enlarged schematic view of a first optical film according to another embodiment of the invention. FIG. 9A is a light intensity distribution diagram of an illumination beam after exiting from the first optical film of FIG. 8A. FIG. 9B is a light intensity distribution diagram of the illumination beam after exiting from the first optical film of FIG. 8B.

Referring to FIG. 6 and FIG. 7, a difference between a display apparatus 10A of the embodiment and the display apparatus 10 of FIG. 1 lies in a different configuration of the first optical film. In the embodiment, a first optical film 120A of a backlight module 50A includes a substrate 121 and a plurality of optical microstructures 122. The substrate 121 has a first surface 121a facing the light guide plate 100 and a second surface 121b facing the second optical film 130. The optical microstructures 122 are provided on the second surface 121b of the substrate 121 of the first optical film 120A. In the embodiment, the optical microstructures 122 are arranged in the direction Y and extend in the direction X. Namely, a long axis direction (an extending direction of a ridge line 122RL) of the optical microstructures 122 of the first optical film 120A is substantially perpendicular to the light incident surface 100b of the light guide plate 100 and an extending direction of a ridge line 132RL of the prism structure 132 of the second optical film 130.

Based on the above configuration relationship, the light collection of the backlight module 50A in the extending direction of the prism structure 132 of the second optical film 130 may be further enhanced, thereby increasing the output brightness value of the backlight module 50A near the normal viewing angle. However, the invention is not limited thereto, and in other embodiments, in order to increase a viewing angle of the backlight module in an arrangement direction of the prism structures 132 of the second optical film 130 (or a direction perpendicular to the light incident surface 100b of the light guide plate 100), the extending direction of the plurality of optical microstructures 122 of the first optical film 120A may also be parallel to the extending direction of the prism structures 132 of the second optical film 130.

Referring to FIG. 8A, in this embodiment, the optical microstructures 122 of the first optical film 120A are prisms.

The prism has an apex angle 122V close to the second optical film 130, and a range A1 of the apex angle 122V is between 120 degrees and 160 degrees. In an exemplary embodiment, the value of the apex angle 122V may be between 140 degrees and 160 degrees. However, the invention is not limited thereto. According to other embodiments, the optical microstructures of the first optical film may also be lenticular lens structures, elliptical lens structures or elongated concave-convex structures.

Referring to FIG. 9A, since the apex angle 122V of the optical microstructure 122 of the first optical film 120A of the embodiment is a sharp angle, a light shape of the illumination beam IB from the light guide plate 100 after passing through the first optical film 120A is relatively asymmetric in a direction perpendicular to the light incident surface 100b of the light guide plate 100 (i.e., an azimuth at a 90-degree angle in FIG. 9A), and the illumination beam IB has a higher output brightness value near the normal viewing angle after passing through the second optical film 130. However, the invention is not limited thereto, and in other embodiments, an apex angle 122V' of an optical microstructure 122A of a first optical film 120A' may be an arc angle (as shown in FIG. 8B). Therefore, the light shape of the illumination beam IB from the light guide plate 100 after passing through the first optical film is relatively symmetric in the direction perpendicular to the light incident surface 100b of the light guide plate 100 (as shown in FIG. 9B), and the illumination beam IB has a lower output brightness value near the normal viewing angle after passing through the second optical film 130.

Figure 10:
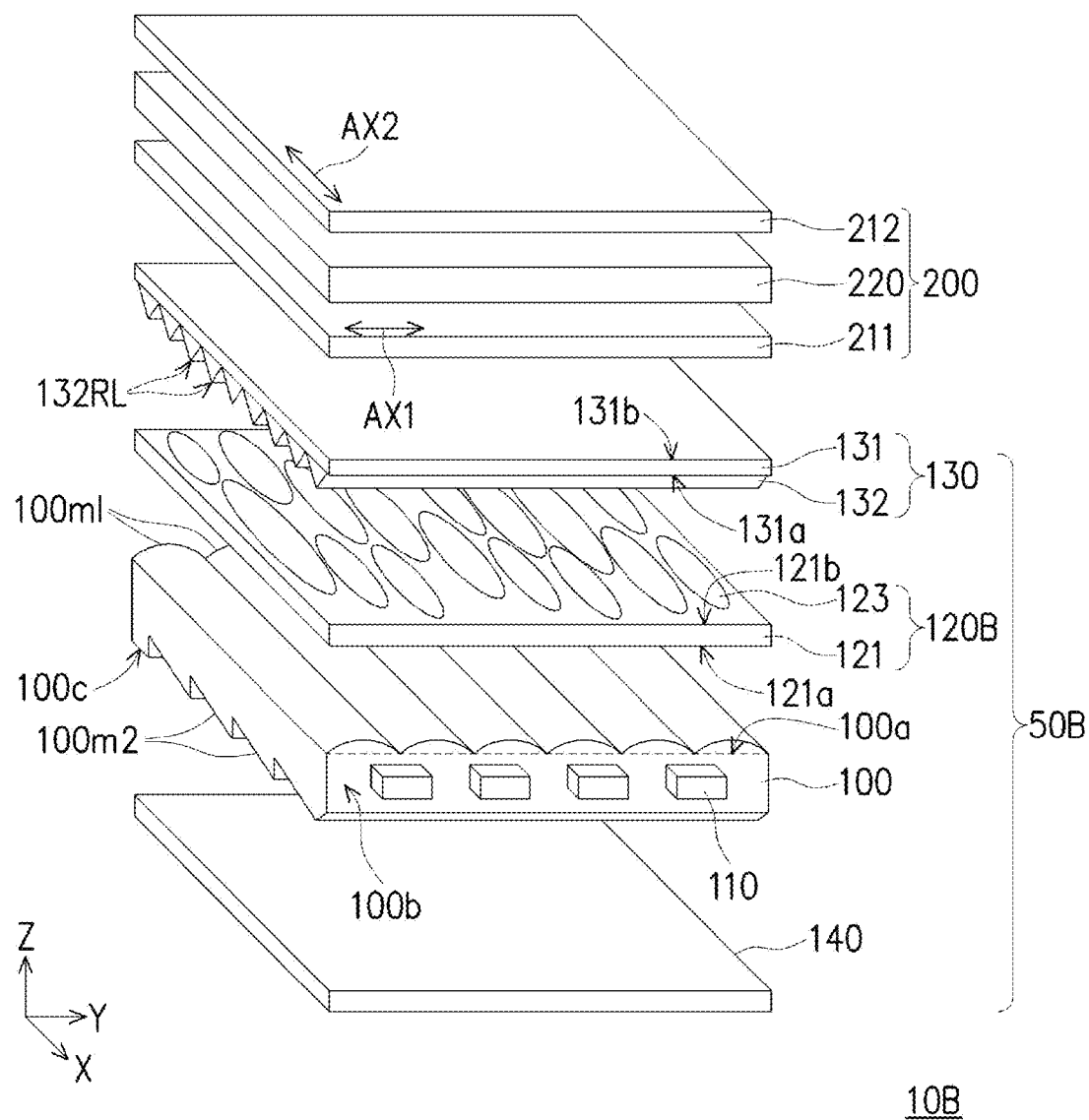
FIG. 10 is a schematic diagram of a display apparatus according to a third embodiment of the invention.
Figure 11:
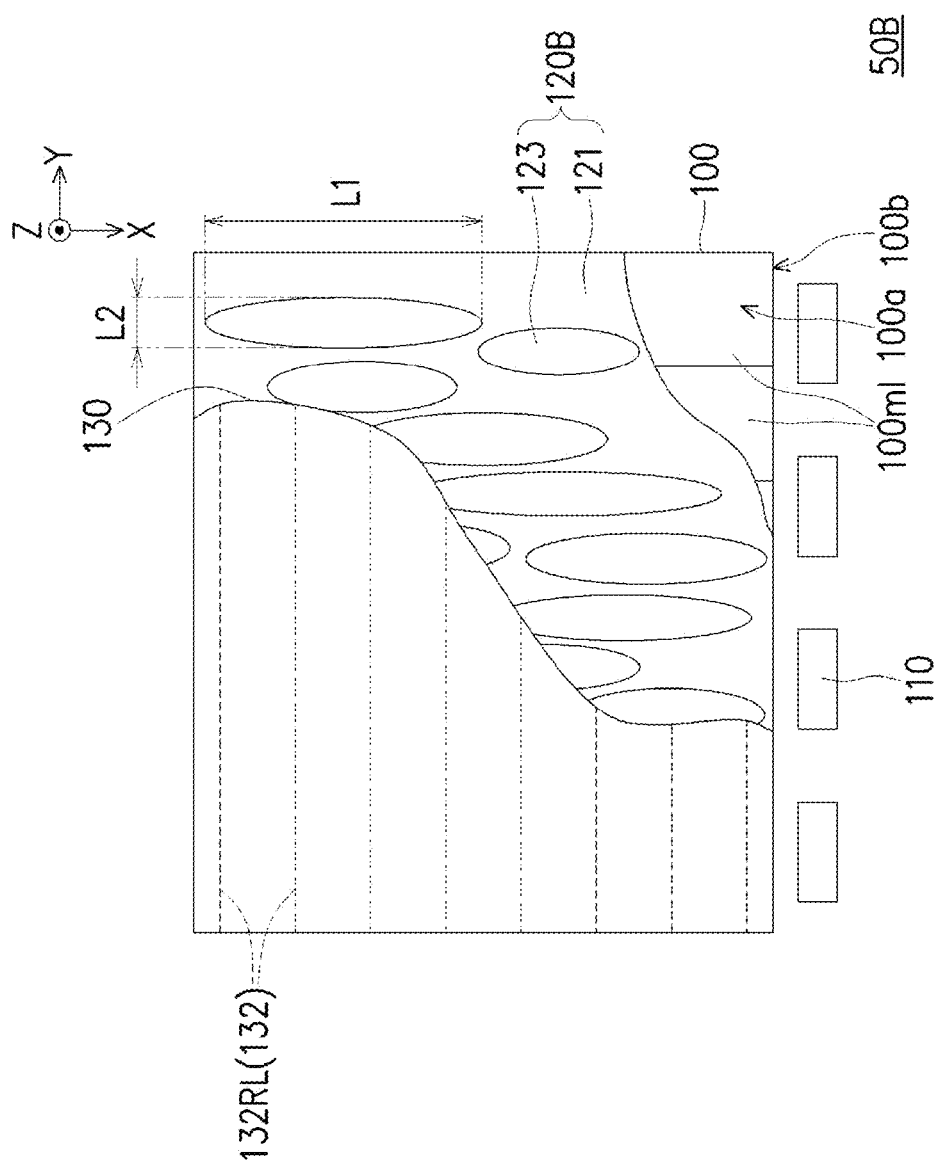
FIG. 11 is a schematic top view of a backlight module of FIG. 10.
Figure 12:
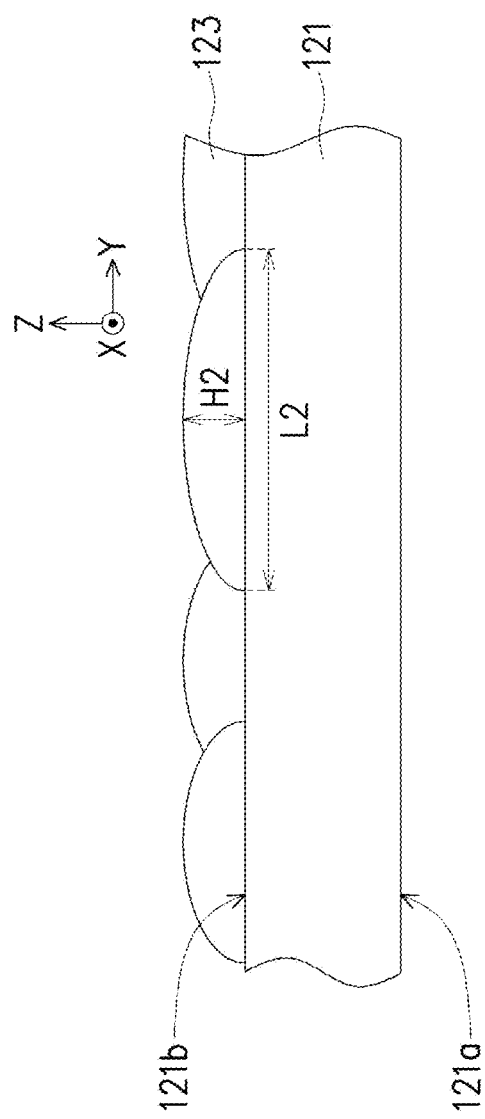
FIG. 12 is a partial enlarged side view of a first optical film of FIG. 10.

FIG. 10 is a schematic diagram of a display apparatus according to a third embodiment of the invention. FIG. 11 is a schematic top view of a backlight module of FIG. 10. FIG. 12 is a partial enlarged side view of a first optical film of FIG. 10. Referring to FIG. 10 to FIG. 12, a difference between a display apparatus 10B of the embodiment and the display apparatus 10 of FIG. 1 lies in a different configuration of the optical microstructures of the first optical film. In the embodiment, an optical microstructure 123 of a first optical film 120B of a backlight module 50B is an elliptical lens structure.

Particularly, the elliptical lens structure respectively has a first length L1 and a second length L2 in a long axis direction and a short axis direction, and a ratio of the first length L1 to the second length L2 is greater than 2. In an exemplary embodiment, the ratio of the first length L1 to the second length L2 of the elliptical lens structure may be greater than 5. In the embodiment, the long axis direction of the elliptical lens structure is a direction perpendicular to the light incident surface 100b of the light guide plate 100, such as the direction X. The short axis direction (for example, the direction Y) is perpendicular to the long axis direction. On the other hand, the elliptical lens structure has a height H2 in a normal direction of the second surface 121b of the substrate 121, and a ratio of the second length L2 to the height H2 is between 1 and 50. In an exemplary embodiment, the ratio of the second length L2 to the height H2 of the elliptical lens structure may be between 2 and 30.

Based on the above configuration relationship, the light collection of the backlight module 50B in the extending direction of the prism structures 132 of the second optical film 130 may be further enhanced, thereby increasing the output brightness value of the backlight module 50B near the normal viewing angle. However, the invention is not limited thereto, and in other embodiments, in order to increase a viewing angle of the backlight module in the arrangement direction of the prism structures 132 of the second optical film 130 (or the direction perpendicular to the light incident surface 100b of the light guide plate 100), the long axis direction of the plurality of elliptical lens structures (i.e., the optical microstructures 123) of the first optical film 120B may also be parallel to the extending direction of the prism structures 132 of the second optical film 130.

On the other hand, by arranging the elliptical lens structures, the second optical film 130 and the first optical film 120B may also be prevented from being adsorbed to cause adsorption marks or Newton's rings. However, the invention is not limited thereto. In other embodiments, the elliptical lens structures may also be arranged on the first surface 121a of the substrate 121 of the first optical film facing the light guide plate 100, so as to avoid the first optical film and the light emitting surface 100a of the light guide plate 100 from being adsorbed to cause adsorption marks or Newton's rings.

Figure 13:
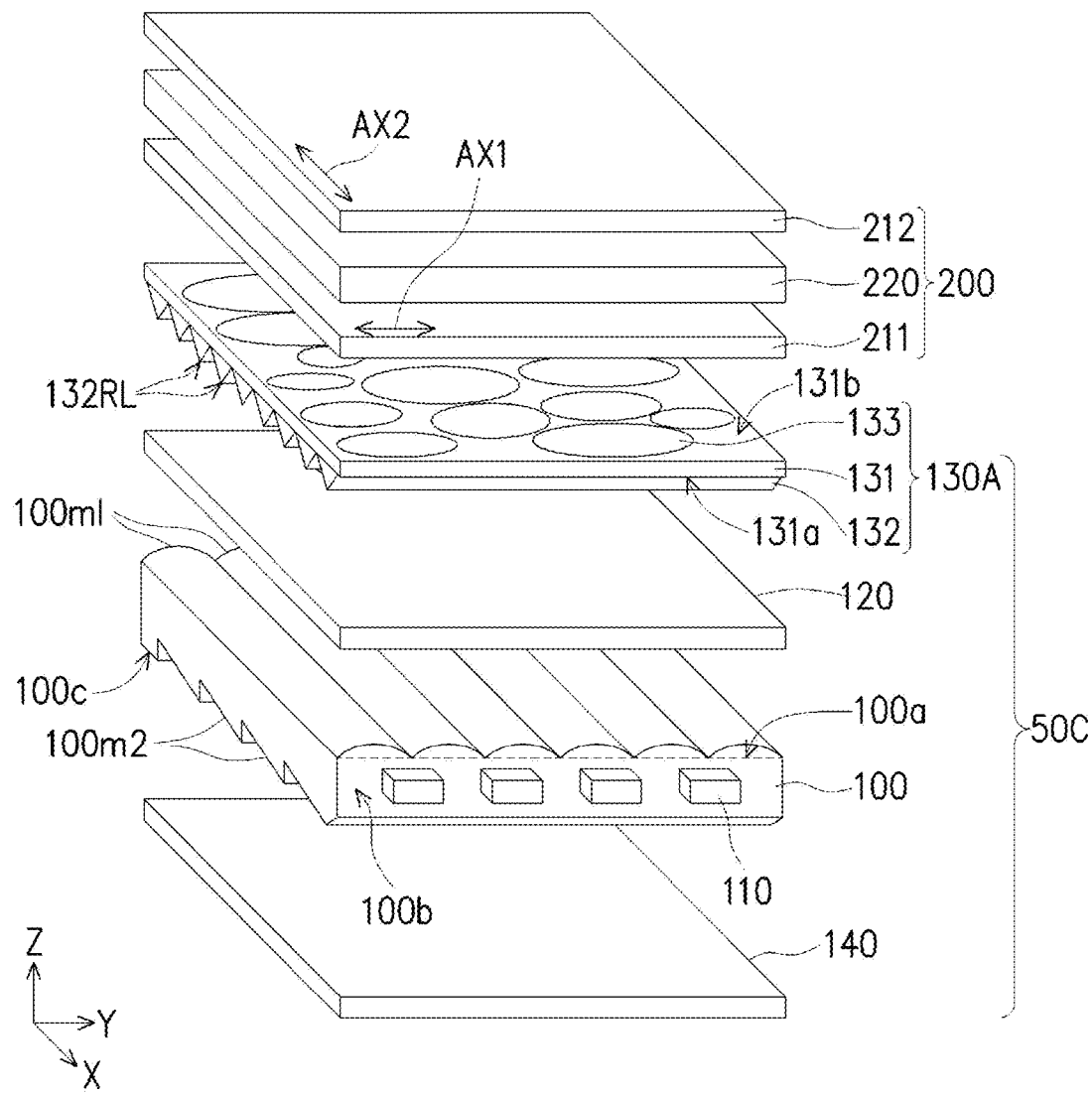
FIG. 13 is a schematic diagram of a display apparatus according to a fourth embodiment of the invention.
Figure 14:
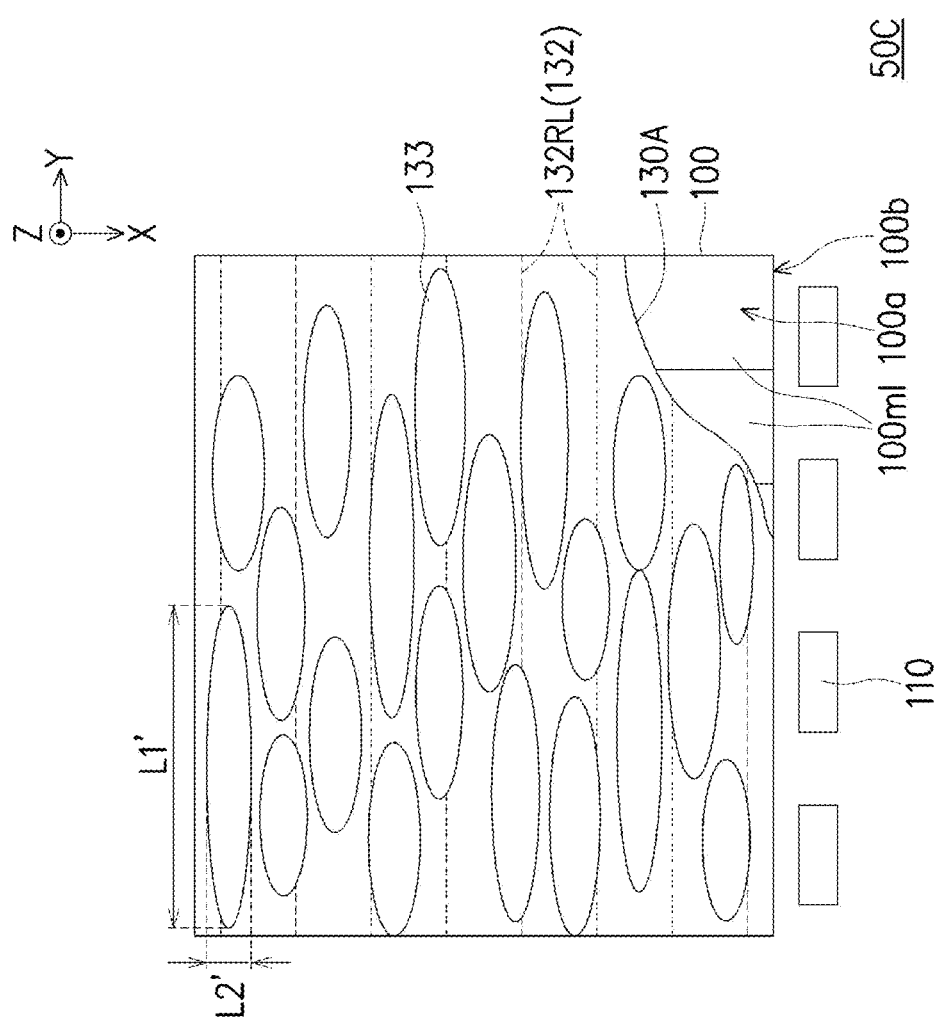
FIG. 14 is a schematic top view of a backlight module of FIG. 13.

FIG. 13 is a schematic diagram of a display apparatus according to a fourth embodiment of the invention. FIG. 14 is a schematic top view of a backlight module of FIG. 13. For clarity's sake, FIG. 14 only illustrates the light guide plate 100, the light source 110, and the second optical film 130A of a backlight module 50C in FIG. 13.

Referring to FIG. 13 and FIG. 14, a difference between a display apparatus 10C of the embodiment and the display apparatus 10 of FIG. 1 lies in a different structural composition of the second optical film. To be specific, in order to increase a viewing angle of the backlight module 50C in the arrangement direction of the prism structures 132 of the second optical film 130A (or the direction perpendicular to the light incident surface 100b of the light guide plate 100), the surface 131b of the substrate 131 of the second optical film 130A facing away from the light guide plate 100 is further provided with a plurality of optical microstructures 133, and an extending direction or a long axis direction of the optical microstructures 133 is parallel to the extending direction of the prism structures 132.

In this embodiment, the optical microstructure 133 of the second optical film 130A is an elliptical lens structure, and the long axis direction of the elliptical lens structure is parallel to the light incident surface 100b of the light guide plate 100. Particularly, the long axis direction of the elliptical lens structure is parallel to the direction of the light incident surface 100b of the light guide plate 100, such as the direction Y. A short axis direction (for example, the direction X) is perpendicular to the long axis direction. The elliptical lens structure respectively has a first length L1' and a second length L2' in the long axis direction and the short axis direction, and a ratio of the first length L1' to the second length L2' is greater than 2. In an exemplary embodiment, the ratio of the first length L1' to the second length L2' of the elliptical lens structure may be greater than 5.

However, the invention is not limited thereto, and in other embodiments, the optical microstructures of the second optical film disposed on the surface 131b of the substrate 131 facing away from the light guide plate 100 may also be prisms, lenticular lens structures, or elongated concave-convex structures. Particularly, in this embodiment, the optical microstructures 133 of the second optical film 130A also have a haze value less than 80%, so as to avoid the viewing angle of the backlight module 50C in the arrangement direction of the prism structures 132 of the second optical film 130A (or the direction perpendicular to the light incident surface 100b of the light guide plate 100) to be too large to reduce the output brightness value near the normal viewing angle. In an exemplary embodiment, the haze value of the optical microstructures 133 of the second optical film 130A may be between 30% and 60%.

Figure 15:
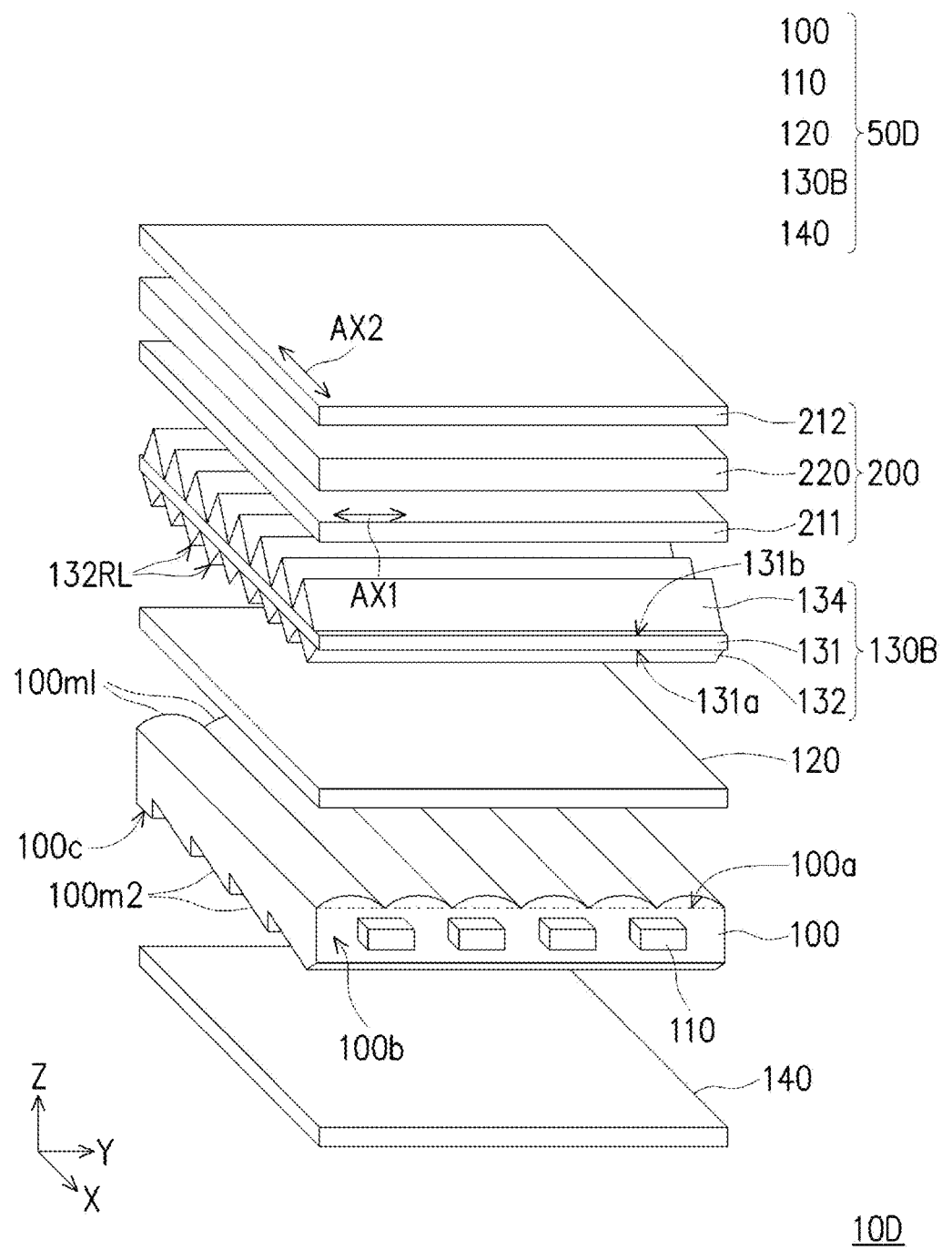
FIG. 15 is a schematic diagram of a display apparatus according to a fifth embodiment of the invention.

FIG. 15 is a schematic diagram of a display apparatus of a fifth embodiment of the invention. Referring to FIG. 15, a difference between a display apparatus 10D of the embodiment and the display apparatus 10C of FIG. 13 lies in a different configuration of the optical microstructures of the second optical film. In the embodiment, in the second optical film 130B of the backlight module 50D, the plurality of optical microstructures 134 arranged on the surface 131b of the substrate 131 facing away from the light guide plate 100 are a plurality of prism structures, and an extending direction of the prism structures are parallel to the light incident surface 100b of the light guide plate 100 and the extending direction of the prism structures 132 (for example, the direction Y). Since a function of the optical microstructures 134 of the second optical film 130B of the embodiment is similar to that of the optical microstructures 133 of the second optical film 130A of FIG. 13, a detailed description thereof may be deduced by referring to the relevant paragraphs of the above embodiment, which is not repeated.

Figure 16:
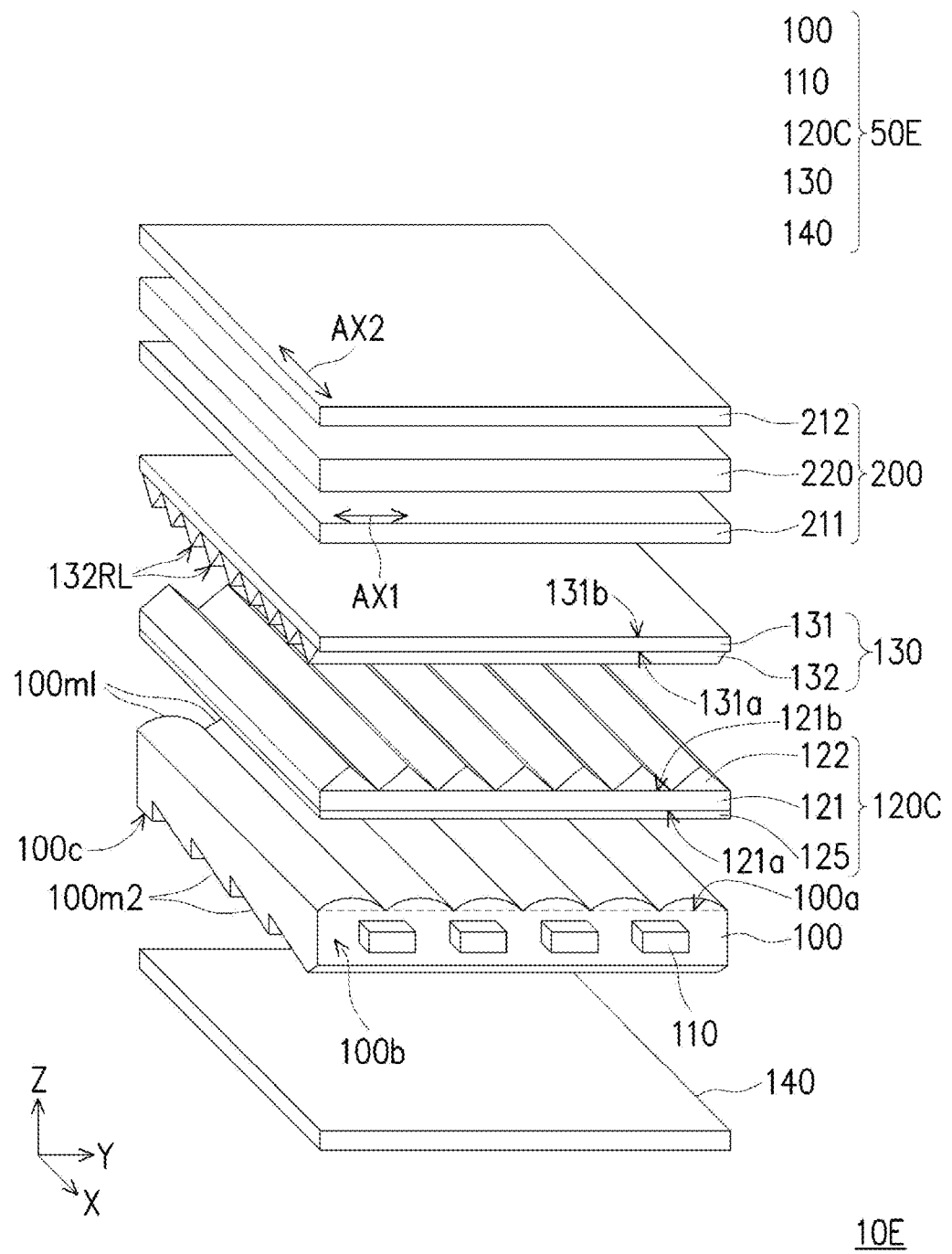
FIG. 16 is a schematic diagram of a display apparatus according to a sixth embodiment of the invention.
Figure 17:
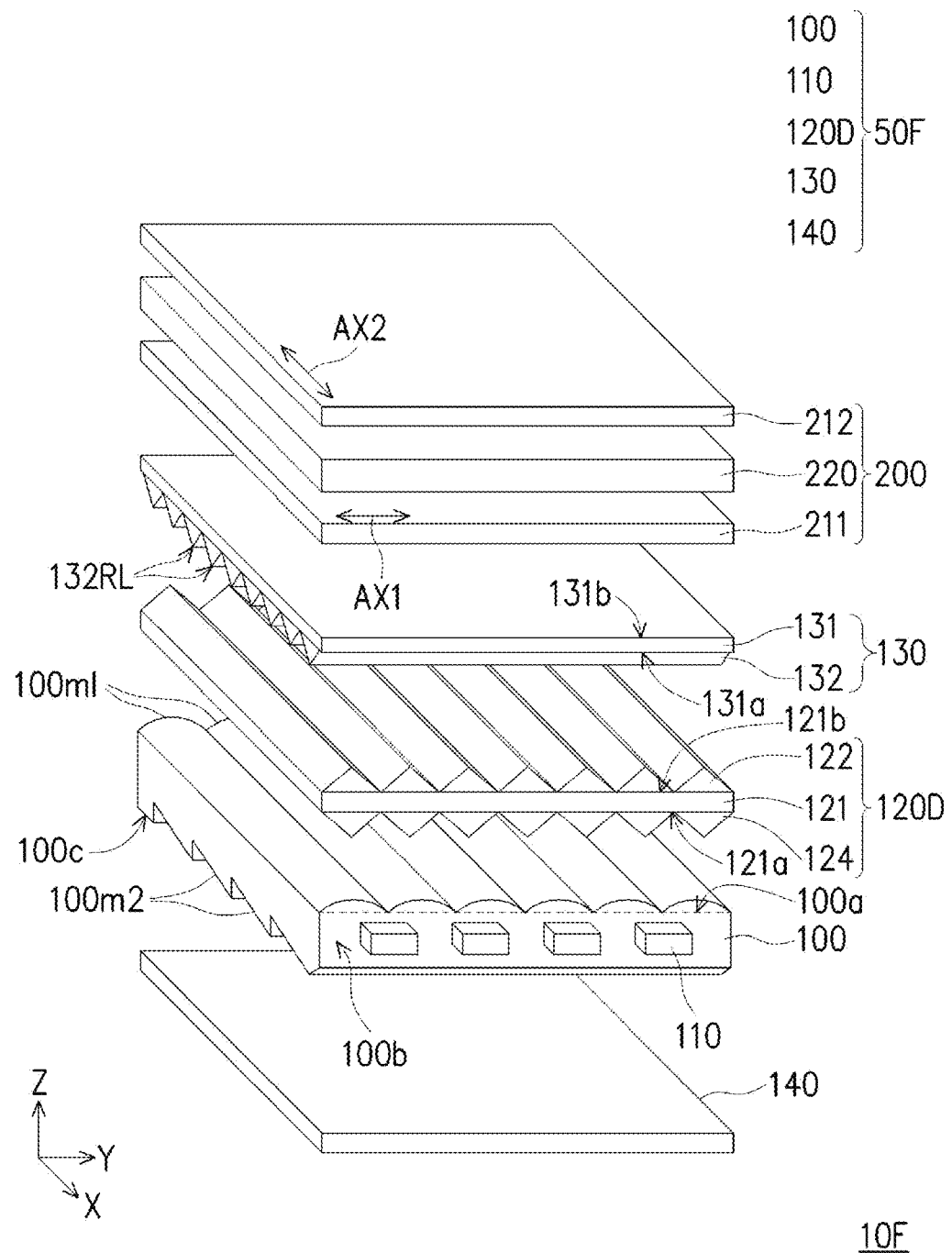
FIG. 17 is a schematic diagram of a display apparatus according to a seventh embodiment of the invention.

FIG. 16 is a schematic diagram of a display apparatus according to a sixth embodiment of the invention. FIG. 17 is a schematic diagram of a display apparatus according to a seventh embodiment of the invention. Referring to FIG. 16, a difference between a display apparatus 10E of the embodiment and the display apparatus 10A of FIG. 6 lies in a different structural composition of the first optical film. To be specific, in order to prevent a first optical film 120C of a backlight module 50E from being adsorbed to the light emitting surface 100a of the light guide plate 100, an optical film layer 125 may be provided on the first surface 121a of the substrate 121 of the first optical film 120C facing the light guide plate 100. For example, in the embodiment, a haze value of the optical film layer 125 may be less than 20%. In an exemplary embodiment, the haze value of the optical film layer 125 may be less than 5%. However, the invention is not limited thereto, and according to other embodiments, the optical film layer 125 may have a pencil hardness greater than 2H and a surface energy lower than that of the substrate 121.

Referring to FIG. 17, in another embodiment, in a first optical film 120D of a backlight module 50F of a display apparatus 10F, the optical film layer 125 of the first optical film 120C of FIG. 16 may be replaced by a plurality of prisms 124, but the invention is not limited thereto. In another embodiment, the first surface 121a of the substrate 121 of the first optical film facing the light guide plate 100 may also be provided with a plurality of elliptical lens structures, a plurality of lenticular lens structures, or a plurality of elongated concave-convex structures, and a long axis direction (or an extending direction) of these structures may be perpendicular or parallel to the light incident surface 100b of the light guide plate 100 to adjust a light shape of the backlight module, for example, to increase light collection or a viewing angle in a specific direction.

Figure 18:
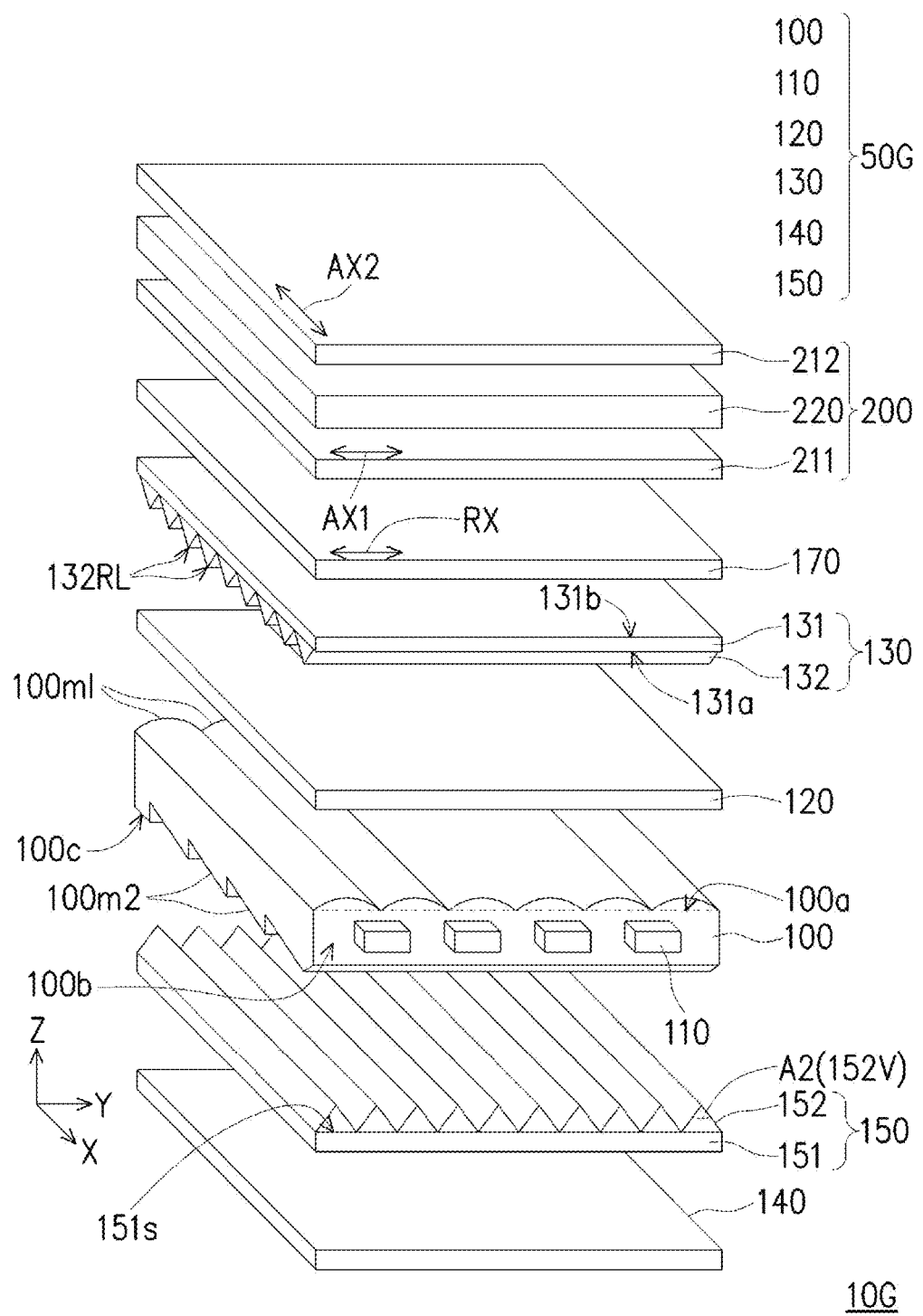
FIG. 18 is a schematic diagram of a display apparatus of an eighth embodiment of the invention.

FIG. 18 is a schematic diagram of a display apparatus of an eighth embodiment of the invention. Referring to FIG. 18, a difference between a display apparatus 10G of the embodiment and the display apparatus 10 of FIG. 1 is that the display apparatus 10G further includes a reflective polarizer 170 disposed between the polarizer 211 and a backlight module 50G. By means of a reflection axis RX of the reflective polarizer 170 being parallel to the light incident surface 100b of the light guide plate 100, a proportion of the first polarization component P1 of the illumination beam IB incident to the display panel 200 may be further increased, thereby increasing a light energy utilization rate of the display apparatus 10G.

On the other hand, the backlight module 50G of the embodiment may also selectively include a third optical film 150 disposed between the light guide plate 100 and the reflector 140. The third optical film 150 includes a substrate 151 and a plurality of prism structures 152 disposed on a third surface 151s of the substrate 151 facing the light guide plate 100. The prism structures 152 are arranged in the direction Y and extend in the direction X. Namely, an extending direction of the prism structures 152 is perpendicular to the light incident surface 100b of the light guide plate 100. In the embodiment, each of the prism structures 152 has an apex angle 152V closer to the light guide plate 100, and a range A2 of the apex angle 152V is between 80 degrees and 100 degrees.

It should be noted that through the arrangement of the third optical film 150, selection flexibility of the reflector 140 may be increased. For example, in order to obtain a cost advantage, the reflector 140 may be a white reflector with a lower cost, and the third optical film 150 may be set to compensate for the loss of a part of the output brightness value of the backlight module 50G generated due to the selection of the white reflector.

Figure 19:
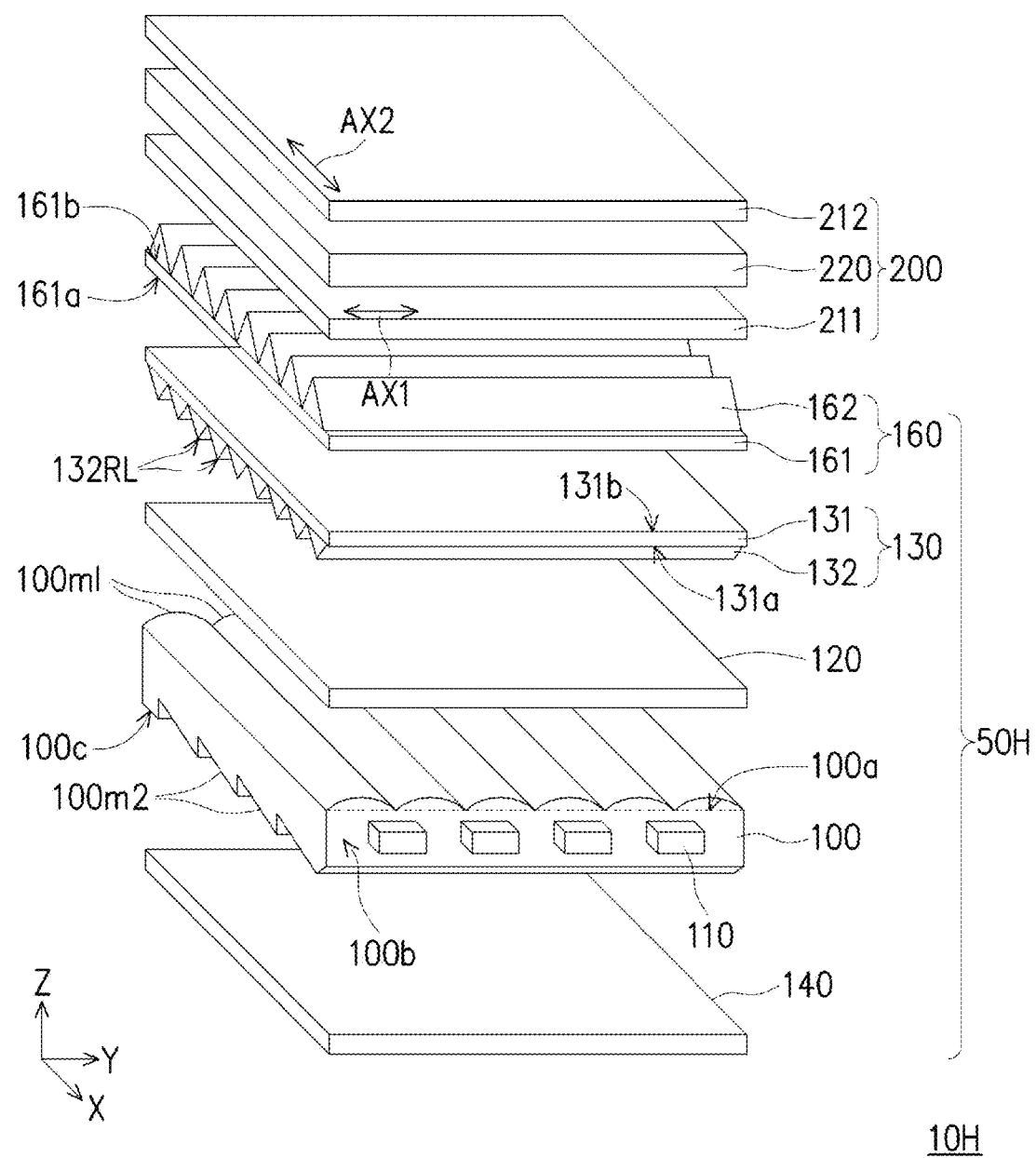
FIG. 19 is a schematic diagram of a display apparatus according to a ninth embodiment of the invention.

FIG. 19 is a schematic diagram of a display apparatus according to a ninth embodiment of the invention. Referring to FIG. 19, a difference between a display apparatus 10H of the embodiment and the display apparatus 10 of FIG. 1 lies in a different composition of a backlight module. In the embodiment, a backlight module 50H further includes a fourth optical film 160 disposed between the second optical film 130 and the display panel 200. The fourth optical film 160 includes a substrate 161 and a plurality of prism structures 162. The substrate 161 has a surface 161a facing the light guide plate 100 and a surface 161b opposite to the surface 161a. In the embodiment, the prism structures 162 may be selectively disposed on the surface 161b of the substrate 161. However, the invention is not limited thereto, and in other embodiments, the prism structures 162 may also be replaced by the optical microstructures 133 (i.e., the elliptical lens structures) of FIG. 13, and in another embodiment, the prism structures 162 may be further changed to be disposed on the surface 161a of the substrate 161.

In this embodiment, the extending direction of the prism structures 132 of the second optical film 130 may be parallel to an extending direction of the prism structures 162 of the fourth optical film 160, but the invention is not limited thereto. Since a function of a combination of the second optical film 130 and the fourth optical film 160 of the embodiment is similar to that of the second optical film 130B of FIG. 15, detailed description thereof may be deduced by referring to the related paragraphs of the aforementioned embodiments and is not repeated herein.

Figure 20:
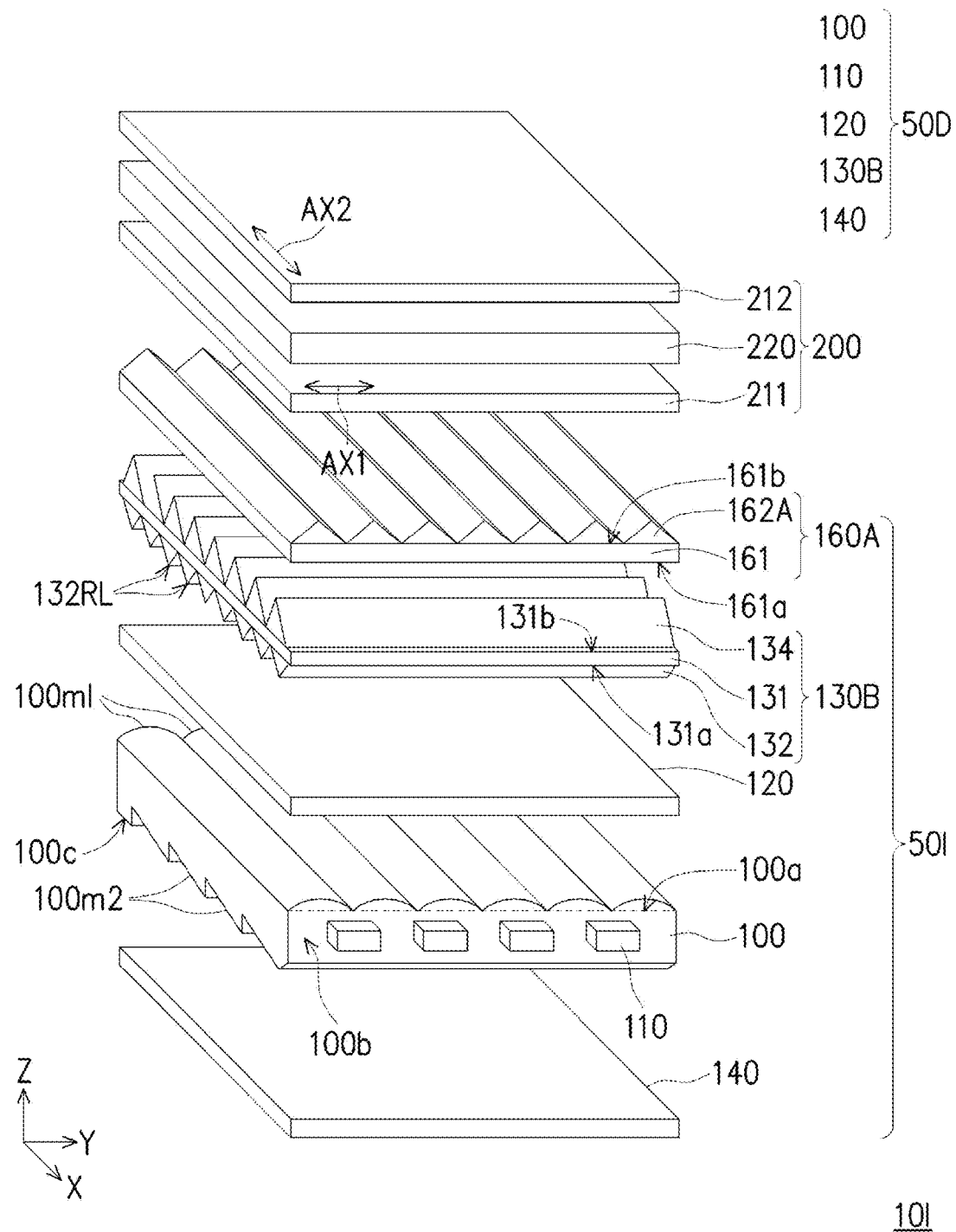
FIG. 20 is a schematic diagram of a display apparatus according to a tenth embodiment of the invention.

FIG. 20 is a schematic diagram of a display apparatus according to a tenth embodiment of the invention. Referring to FIG. 20, a difference between a display apparatus 10I of the embodiment and the display apparatus 10D of FIG. 15 is that a backlight module 50I of the display apparatus 10I further includes a fourth optical film disposed between the second optical film 130B and the display panel 200. The fourth optical film 160A includes a substrate 161 and a plurality of optical microstructures 162A. The substrate 161 has a surface 161a facing the light guide plate 100 and a surface 161b opposite to the surface 161a. In the embodiment, the optical microstructures 162A are, for example, a plurality of prism structures. The prism structures may be selectively disposed on the surface 161b of the substrate 161, and an extending direction thereof is perpendicular to the light incident surface 100b of the light guide plate 100.

Through the arrangement of the optical microstructures 162A, the viewing angle of the backlight module 501 in the extending direction (for example, the direction Y) of the plurality of prism structures 132 (or the plurality of optical microstructures 134) of the second optical film 130B may be increased. However, the invention is not limited thereto. According to other embodiments, the optical microstructures 162A of the fourth optical film may also be replaced by a plurality of elliptical lens structures (such as the optical microstructures 123 in FIG. 10), and in another embodiment, the prism structures 162 may be further changed to be disposed on the surface 161a of the substrate 161.

In view of the foregoing, in the backlight module and the display apparatus of the embodiments of the invention, the first optical film and the second optical film are disposed on one side of the light emitting surface of the light guide plate. One side of the second optical film facing the light guide plate is provided with a plurality of prism structures with the extending direction substantially parallel to the light incident surface of the light guide plate. The first optical film located between the prism structures and the light guide plate may increase a polarization component of the illumination beam from the light guide plate in a specific direction, which is beneficial to an increase in the light energy utilization rate of the display apparatus. Moreover, through the arrangement of the first optical film, the light emitting surface of the light guide plate is prevented from being scratched by the prism structures of the second optical film, so the production yield of the backlight module is prevented from being affected.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be configured to interpret or limit the scope or meaning of the claims. Any advantages and benefits described may not apply to all embodiments of the invention.

It should be appreciated that variations may be made in the embodiments described by persons skilled in the art without departing from the scope of the present invention as defined by the following claims. Moreover, no element and component in the present invention is intended to be dedicated to the public regardless of whether the element or component is explicitly recited in the following claims.

What is claimed is:

1. A backlight module, comprising a light guide plate, a light source, a first optical film, and a second optical film, wherein,
the light guide plate has a light incident surface and a light emitting surface connected to each other;
the light source is disposed on one side of the light incident surface of the light guide plate and is configured to emit an illumination beam;
the first optical film is disposed on one side of the light emitting surface of the light guide plate and comprises a substrate and a plurality of optical microstructures, wherein the illumination beam has a first polarization component parallel to a virtual surface and a second polarization component perpendicular to the virtual surface after passing through the first optical film, the virtual surface is perpendicular to the light incident surface and the light emitting surface, and a ratio of the first polarization component to the second polarization component is greater than or equal to 1.2 and less than or equal to 10, and
the second optical film is disposed on one side of the first optical film facing away from the light guide plate, and the second optical film comprises a substrate and a plurality of prism structures, wherein,
the prism structures are disposed on one side of the substrate of the second optical film facing the light guide plate, and an included angle between an extending direction of the prism structures of the second optical film and the light incident surface of the light guide plate is less than 5 degrees,
the substrate of the first optical film has a first surface facing the light guide plate and a second surface facing the second optical film, and
the plurality of optical microstructures are arranged on at least one of the first surface and the second surface, and a long axis direction of the plurality of optical microstructures is perpendicular to the light incident surface of the light guide plate.

2. The backlight module according to claim 1, wherein an included angle between the illumination beam incident to the first optical film and a normal direction of the first surface of the first optical film is greater than 50 degrees.

3. The backlight module according to claim 1, wherein the light guide plate further has a bottom surface connected to the light incident surface and opposite to the light emitting surface and a plurality of optical microstructures arranged on the bottom surface, and an included angle between a light-facing surface of each of the plurality of optical microstructures of the light guide plate and the bottom surface of the light guide plate is between 1 degree and 10 degrees.

4. The backlight module according to claim 3, wherein the light guide plate further comprises:
a plurality of lenticular lens structures, arranged on the light emitting surface, wherein an extending direction of the plurality of lenticular lens structures is perpendicular to the light incident surface, each of the plurality of lenticular lens structures has a height parallel to a normal direction of the light emitting surface and a width parallel to the light incident surface and the light emitting surface, and a ratio of the height to the width is greater than 0.15.

5. The backlight module according to claim 1, wherein each of the plurality of prism structures of the second optical film has a prism light-facing surface facing the light source and a shady surface facing away from the light source, one of the shady surface and the prism light-facing surface has a first part connected to the substrate of the second optical film and a second part connected between the other one of the prism light-facing surface and the shady surface and the first part, an included angle between the first part of the one of the shady surface and the prism light-facing surface and the other one of the prism light-facing surface and the shady surface is between 62 degrees and 68 degrees, and an included angle between the second part and a virtual extending surface of the first part is between 2 degrees and 4 degrees.

6. The backlight module according to claim 5, wherein the other one of the prism light-facing surface and the shady surface has a third part and a fourth part connected between the one of the prism light-facing surface and the shady surface and the third part, an included angle between the third part and the first part is between 62 degrees and 68 degrees, and an included angle between the fourth part and a virtual extending surface of the third part is between 2 degrees and 4 degrees.

7. The backlight module according to claim 1, wherein each of the plurality of prism structures of the second optical film has a prism light-facing surface facing the light source and a shady surface facing away from the light source, an included angle between the prism light-facing surface and the substrate of the second optical film is equal to an included angle between the shady surface and the substrate of the second optical film, and an included angle between the prism light-facing surface and the shady surface is between 59 degrees and 67 degrees.

8. The backlight module according to claim 7, wherein the included angle between the prism light-facing surface and the shady surface is between 60 degrees and 64 degrees.

9. The backlight module according to claim 1, wherein each of the plurality of prism structures of the second optical film has a prism light-facing surface facing the light source and a shady surface facing away from the light source, an included angle between the prism light-facing surface and the substrate of the second optical film is not equal to an included angle between the shady surface and the substrate of the second optical film, and an included angle between the prism light-facing surface and the shady surface is between 48 degrees and 74 degrees.

10. The backlight module according to claim 9, wherein the included angle between the prism light-facing surface and the shady surface is between 48 degrees and 64 degrees.

11. The backlight module according to claim 1, further comprising a reflector and a third optical film, wherein
the reflector is disposed on one side of a bottom surface of the light guide plate, the bottom surface is connected to the light incident surface and opposite to the light emitting surface, and
the third optical film is disposed between the light guide plate and the reflector and comprises a substrate and a plurality of prism structures, wherein,
the substrate of the third optical film has a third surface facing the light guide plate, and
the plurality of prism structures are arranged on the third surface, an extending direction of the plurality of prism structures of the third optical film is perpendicular to the light incident surface of the light guide plate, each of the plurality of prism structures of the third optical film has an apex angle closer to the light guide plate, and a range of the apex angle is between 80 degrees and 100 degrees.

12. The backlight module according to claim 1, wherein each of the plurality of optical microstructures of the first optical film is a prism, and the prism has an apex angle closer to the second optical film, and a range of the apex angle is between 120 degrees and 160 degrees.

13. The backlight module according to claim 1, wherein each of the plurality of optical microstructures of the first optical film is an elliptical lens structure, a ratio of a first length of the elliptical lens structure in the long axis direction to a second length of the elliptical lens structure in a short axis direction is greater than 2, and the short axis direction is perpendicular to the long axis direction.

14. The backlight module according to claim 13, wherein the elliptical lens structure has a height in a normal direction of the second surface, and a ratio of the second length to the height is between 1 and 50.

15. The backlight module according to claim 1, wherein the plurality of optical microstructures of the first optical film are disposed on the second surface, the first optical film further comprises an optical film layer disposed on the first surface, and a haze value of the optical film layer is less than 20%.

16. The backlight module according to claim 1, wherein the plurality of optical microstructures of the first optical film are disposed on the second surface, the first optical film further comprises an optical film layer disposed on the first surface, and the optical film layer has a pencil hardness greater than 2H.

17. The backlight module according to claim 1, wherein at least one of the substrate of the first optical film and the substrate of the second optical film has birefringence, and an optical axis of the at least one is parallel or perpendicular to the light incident surface.

18. The backlight module according to claim 1, further comprising:
a fourth optical film, arranged on one side of the second optical film facing away from the light guide plate, wherein the fourth optical film comprises a substrate and a plurality of prism structures, wherein,
the plurality of prism structures are arranged on the substrate of the fourth optical film, wherein an extending direction of the plurality of prism structures of the fourth optical film is perpendicular or parallel to the plurality of prism structures of the second optical film.

19. A backlight module, comprising a light guide plate, a light source, a first optical film, and a second optical film, wherein,
the light guide plate has a light incident surface and a light emitting surface connected to each other;
the light source is disposed on one side of the light incident surface of the light guide plate and is configured to emit an illumination beam;
the first optical film is disposed on one side of the light emitting surface of the light guide plate, wherein the illumination beam has a first polarization component parallel to a virtual surface and a second polarization component perpendicular to the virtual surface after passing through the first optical film, the virtual surface is perpendicular to the light incident surface and the light emitting surface, and a ratio of the first polarization component to the second polarization component is greater than or equal to 1.2 and less than or equal to 10, and
the second optical film is disposed on one side of the first optical film facing away from the light guide plate, and the second optical film comprises a substrate and a plurality of prism structures, wherein,
the prism structures are disposed on one side of the substrate of the second optical film facing the light guide plate, and an included angle between an extending direction of the prism structures of the second optical film and the light incident surface of the light guide plate is less than 5 degrees,
wherein the second optical film further comprises:
a plurality of optical microstructures, arranged on one side of the substrate of the second optical film facing away from the light guide plate, wherein a long axis direction of the plurality of optical microstructures of the second optical film is parallel to the light incident surface of the light guide plate.

20. The backlight module according to claim 19, wherein each of the plurality of optical microstructures of the second optical film is an elliptical lens structure, a ratio of a length of the elliptical lens structure in the long axis direction to a length of the elliptical lens structure in a short axis direction is greater than 2, and the short axis direction is perpendicular to the long axis direction.

21. The backlight module according to claim 20, wherein a haze value of the plurality of optical microstructures of the second optical film is between 30% and 60%.

22. The backlight module according to claim 19, wherein each of the plurality of optical microstructures of the second optical film is a prism or a lenticular lens.

23. A display apparatus, comprising a display panel and a backlight module, wherein
the backlight module is disposed in overlap with the display panel and comprises a light guide plate, a light source, a first optical film, and a second optical film, wherein,
the light guide plate has a light incident surface and a light emitting surface connected to each other,
the light source is disposed on one side of the light incident surface of the light guide plate and is configured to emit an illumination beam;
the first optical film is disposed on one side of the light emitting surface of the light guide plate and comprises a substrate and a plurality of optical microstructures, wherein the illumination beam has a first polarization component parallel to a virtual surface and a second polarization component perpendicular to the virtual surface after passing through the first optical film, the virtual surface is perpendicular to the light incident surface and the light emitting surface, and a ratio of the first polarization component to the second polarization component is greater than or equal to 1.2 and less than or equal to 10; and
the second optical film is disposed on one side of the first optical film facing away from the light guide plate and comprises a substrate and a plurality of prism structures, wherein
the prism structures are disposed on one side of the substrate of the second optical film facing the light guide plate, and an included angle between an extending direction of the prism structures and the light incident surface of the light guide plate is less than 5 degrees, the substrate of the first optical film has a first surface facing the light guide plate and a second surface facing the second optical film, and the plurality of optical microstructures are arranged on at least one of the first surface and the second surface, and a long axis direction of the plurality of optical microstructures is perpendicular to the light incident surface of the light guide plate.

24. The display apparatus according to claim 23, wherein the display panel has a polarizer closer to the backlight module than an upper polarizer is to the backlight module, and an absorption axis of the polarizer is parallel to the light incident surface of the light guide plate.

25. The display apparatus according to claim 24, further comprising:

a reflective polarizer, arranged between the polarizer and the backlight module, wherein a reflection axis of the reflective polarizer is parallel to the light incident surface of the light guide plate.

* * * * *